(12) United States Patent
Liao et al.

(10) Patent No.: US 10,212,537 B2
(45) Date of Patent: Feb. 19, 2019

(54) D2D COMMUNICATION DISCOVERY METHOD, APPARATUS, AND SYSTEM

(71) Applicant: Huawei Technologies Co., Ltd., Shenzhen (CN)

(72) Inventors: Defu Liao, Hangzhou (CN); Meixin Lin, Hangzhou (CN); Guangzhu Zeng, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/331,522

(22) Filed: Oct. 21, 2016

(65) Prior Publication Data
US 2017/0041973 A1 Feb. 9, 2017

Related U.S. Application Data

(63) Continuation of application No. PCT/CN2014/075938, filed on Apr. 22, 2014.

(51) Int. Cl.
*H04W 4/02* (2018.01)
*H04W 76/14* (2018.01)
(Continued)

(52) U.S. Cl.
CPC .............. *H04W 4/02* (2013.01); *H04L 67/16* (2013.01); *H04W 4/70* (2018.02); *H04W 8/005* (2013.01);
(Continued)

(58) Field of Classification Search
CPC ........ H04W 4/02; H04W 64/00; H04L 67/16; H04L 67/18; H04L 67/24
See application file for complete search history.

(56) References Cited

U.S. PATENT DOCUMENTS

| 9,924,322 B2 * | 3/2018 | Post ...................... H04W 4/025 |
| 2007/0118604 A1 * | 5/2007 | Costa Requena ....... H04L 51/04 |
| | | 709/206 |

(Continued)

FOREIGN PATENT DOCUMENTS

| CN | 103369604 A | 10/2013 |
| CN | 103416081 A | 11/2013 |

(Continued)

OTHER PUBLICATIONS

3GPP TR 23.703 Technical Report, V2.0.0 (Feb. 2014), 3rd Generation Partnership Project; Technical Specification Group Services and System Aspects; Study on architecture, enhancements to support Proximity-based Services (ProSe) (Release 12), pp. 1-324.

*Primary Examiner* — Raj Jain
(74) *Attorney, Agent, or Firm* — Slater Matsil, LLP

(57) ABSTRACT

A D2D communication discovery method, an apparatus, and a system are disclosed. In an embodiment the D2D communication method includes acquiring, at an application layer, location information of a first user equipment and location information of a second user equipment, calculating a distance between the first user equipment and the second user equipment according to the location information of the first user equipment and the location information of the second user equipment and sending a D2D link establishment instruction to the first user equipment according to the distance between the first user equipment and the second user equipment so that the first user equipment and the second user equipment establish a D2D communication link.

14 Claims, 11 Drawing Sheets

(51) Int. Cl.
*H04W 4/70* (2018.01)
*H04W 76/10* (2018.01)
*H04L 29/08* (2006.01)
*H04W 8/00* (2009.01)
*H04W 88/02* (2009.01)

(52) U.S. Cl.
CPC ........... *H04W 76/10* (2018.02); *H04W 76/14* (2018.02); *H04W 88/02* (2013.01); *Y02D 70/1262* (2018.01); *Y02D 70/142* (2018.01); *Y02D 70/144* (2018.01); *Y02D 70/164* (2018.01); *Y02D 70/21* (2018.01); *Y02D 70/22* (2018.01)

(56) References Cited

U.S. PATENT DOCUMENTS

| | | | | |
|---|---|---|---|---|
| 2013/0316727 A1* | 11/2013 | Edge | ............... | H04W 4/02 455/456.1 |
| 2014/0056220 A1 | 2/2014 | Poitau et al. | | |
| 2014/0057667 A1 | 2/2014 | Blankenship et al. | | |
| 2015/0024745 A1 | 1/2015 | Zhou et al. | | |
| 2015/0229650 A1* | 8/2015 | Grigg | ............... | H04L 63/105 726/7 |
| 2015/0382174 A1 | 12/2015 | Guo et al. | | |
| 2017/0041973 A1* | 2/2017 | Liao | ............... | H04W 76/14 |
| 2017/0055128 A1 | 2/2017 | Smith | | |

FOREIGN PATENT DOCUMENTS

| | | |
|---|---|---|
| CN | 103503540 A | 1/2014 |
| JP | 2006523404 | 10/2006 |
| RU | 2571825 C2 | 12/2015 |
| WO | 2004080103 A1 | 9/2004 |
| WO | 2013149428 A1 | 10/2013 |
| WO | 2013176999 A1 | 11/2013 |
| WO | 2014031245 A1 | 2/2014 |
| WO | 2014051479 A1 | 4/2014 |

\* cited by examiner

D2D COMMUNICATION DISCOVERY METHOD, APPARATUS, AND SYSTEM

CROSS-REFERENCE TO RELATED APPLICATIONS

This application is a continuation of International Application No. PCT/CN2014/075938, filed on Apr. 22, 2014, the disclosure of which is hereby incorporated by reference in its entirety.

TECHNICAL FIELD

The present invention relates to the communications field, and in particular, to a D2D (device-to-device) communication discovery method, apparatus, and system.

BACKGROUND

D2D communication is a technology that directly performs data exchange or a service without forwarding by using a network. For example, a Bluetooth module of a terminal may be always enabled for scanning, or when a transmission distance supported by Bluetooth is satisfied, a user manually enables a Bluetooth module at a local end, to establish a connection with scanned peer-end Bluetooth. The user may select data to be transmitted by using Bluetooth, and data transmission may be performed by using Bluetooth between the local end and the peer end. In this way, a process of D2D discovery and data transmission is completed.

An LTE (Long Term Evolution) cellular network may include user equipment A (UE A,), user equipment B (UE B), a ProSe A server to which the UEA belongs, a ProSe Server B to which the UEB belongs, a GMLC (Gateway Mobile Location Center) A to which the UEA belongs, and a GMLC B to which the UEB belongs. In the prior art, steps of establishing D2D communication in the LTE cellular network may include: (1) The UE A registers with the ProSe server A to which the UEA belongs, and the ProSe server A obtains a ProSe identifier A and an application identifier A of the UE A; the UE B registers with the ProSe server B to which the UE B belongs, and the ProSe server B obtains a ProSe identifier B and an application identifier B of the UE B. (2) The GMLC A updates location information of the UE A, the GMLC B updates location information of the UE B, the ProSe server A may obtain the location information of the UEA from the GMLC A, the ProSe server B may obtain the location information of the UEB from the GMLC B, the ProSe server A may obtain the location information of the UE B from the ProSe server B, and the ProSe server B may obtain the location information of the UE A from the ProSe server A. (3) The UE A requests to the ProSe server A for a D2D pairing with the UEB. For example, the ProSe server A may calculate a distance D between the UE A and the UEB according to the location information of the UE A and the location information of the UE B, and determine whether the distance D meets a pairing distance S; and if the distance D meets the pairing distance S, notify the UE A that the UE A can perform D2D communication with the UEB. In the prior art, the following problems exist in establishing D2D communication in the LTE cellular network: A third-party server needs to be deployed, and for different operators, message interfaces for different ProSe servers further need to be deployed, which increases a deployment difficulty. In addition, a network element, such as a core network, an access network, or user equipment, needs to support positioning, and network signaling overheads are high, which increases burden of the cellular network. Moreover, there lacks diversified positioning manners. Currently, a manner having relatively high positioning precision, that is, OTDOA (Observed Time Difference of Arrival), may be used in the LTE cellular network, but the positioning precision is far lower than a positioning manner such as GPS (Global Positioning System).

SUMMARY

Embodiments of the present invention provide a D2D communication discovery method, apparatus, and system, which can automatically implement D2D communication discovery at an application layer, thereby reducing network signaling overheads, and improving a hit rate of D2D communication.

A D2D communication discovery method provided in a first aspect of the embodiments of this application includes:
  acquiring, at an application layer, location information of first user equipment and location information of second user equipment;
  calculating a distance between the first user equipment and the second user equipment according to the location information of the first user equipment and the location information of the second user equipment; and
  sending a D2D link establishment instruction to the first user equipment according to the distance between the first user equipment and the second user equipment, so that the first user equipment and the second user equipment establish a D2D communication link.

According to a second aspect, a D2D communication discovery apparatus provided in an embodiment of the present invention includes:
  a location information acquiring unit, configured to acquire location information of first user equipment and location information of second user equipment;
  a calculating unit, configured to calculate a distance between the first user equipment and the second user equipment according to the location information of the first user equipment and the location information of the second user equipment that are acquired by the location information acquiring unit; and
  a sending unit, configured to send, according to the distance between the first user equipment and the second user equipment that is calculated by the calculating unit, a D2D link establishment instruction to the first user equipment, so that the first user equipment and the second user equipment establish a D2D communication link.

According to a third aspect, user equipment provided in an embodiment of the present invention includes the apparatus according to any one of the second aspect, the first possible implementation manner, the second possible implementation manner, the third possible implementation manner, the sixth possible implementation manner, the seventh possible implementation manner, or the eighth possible implementation manner of the second aspect.

According to a fourth aspect, an application server provided in an embodiment of the present invention includes the apparatus according to any one of the second aspect, the first possible implementation manner, the fourth possible implementation manner, the fifth possible implementation manner, the sixth possible implementation manner, the seventh possible implementation manner, or the eighth possible implementation manner of the second aspect.

According to a fifth aspect, a D2D communication discovery system provided in an embodiment of the present invention includes the user equipment according to the third aspect and the application server according to the fourth aspect.

Implementing the embodiments of the present invention has the following beneficial effects:

According to the embodiments of the present invention, D2D communication discovery can be automatically implemented at an application layer, where the application layer is the seventh layer of a computer network architecture OSI, and an application-layer device is, for example, an application server or user equipment. Specifically, location information of first user equipment and location information of second user equipment may be acquired at the application layer, so that a distance between the first user equipment and the second user equipment is calculated according to the location information of the first user equipment and the location information of the second user equipment, a D2D link establishment instruction is sent to the first user equipment according to the distance between the first user equipment and the second user equipment, and then the first user equipment and the second user equipment establish a D2D communication link. According to the embodiments of the present invention, D2D communication discovery can be implemented by an application server and user equipment, or D2D communication discovery can be implemented by two user equipments, without deploying another device or an additional interface, which reduces network signaling overheads and reduces power consumption. In addition, location information of the user equipments is acquired at the application layer, for example, the location information may be acquired in one or a combination of multiple manners such as GPS positioning, cell positioning, or cloud positioning. Multiple positioning manners can be supported, which improves positioning precision and can optimize network performance.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
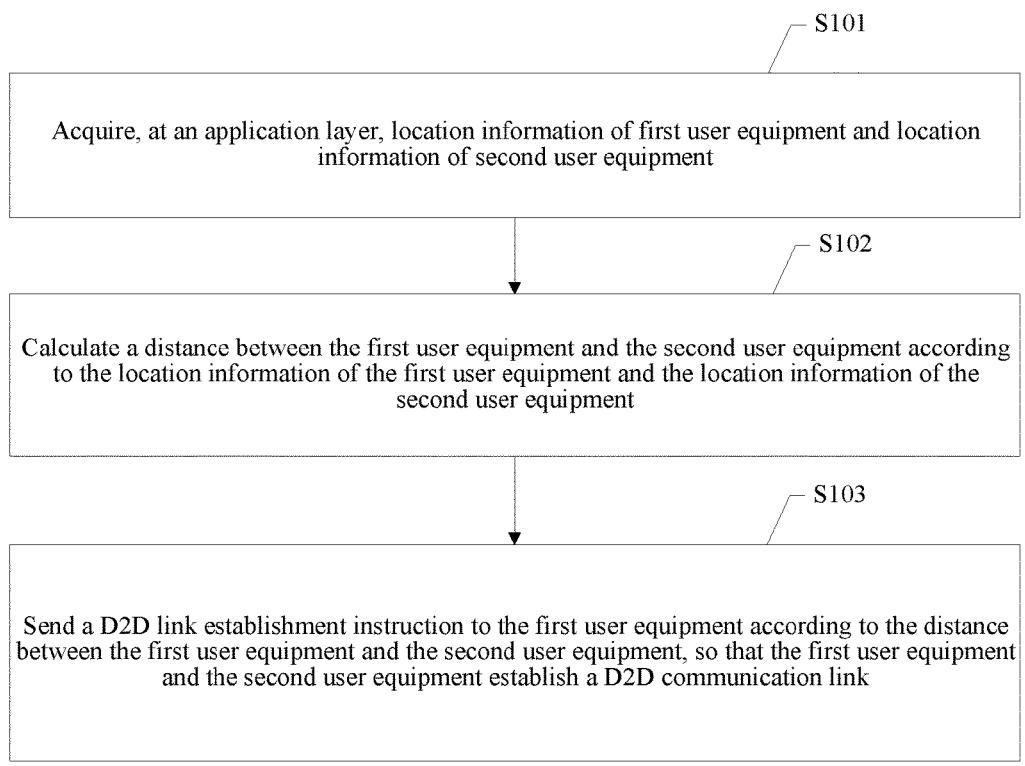
FIG. 1 is a flowchart of a D2D communication discovery method according to a first embodiment of the present invention.
Figure 2:
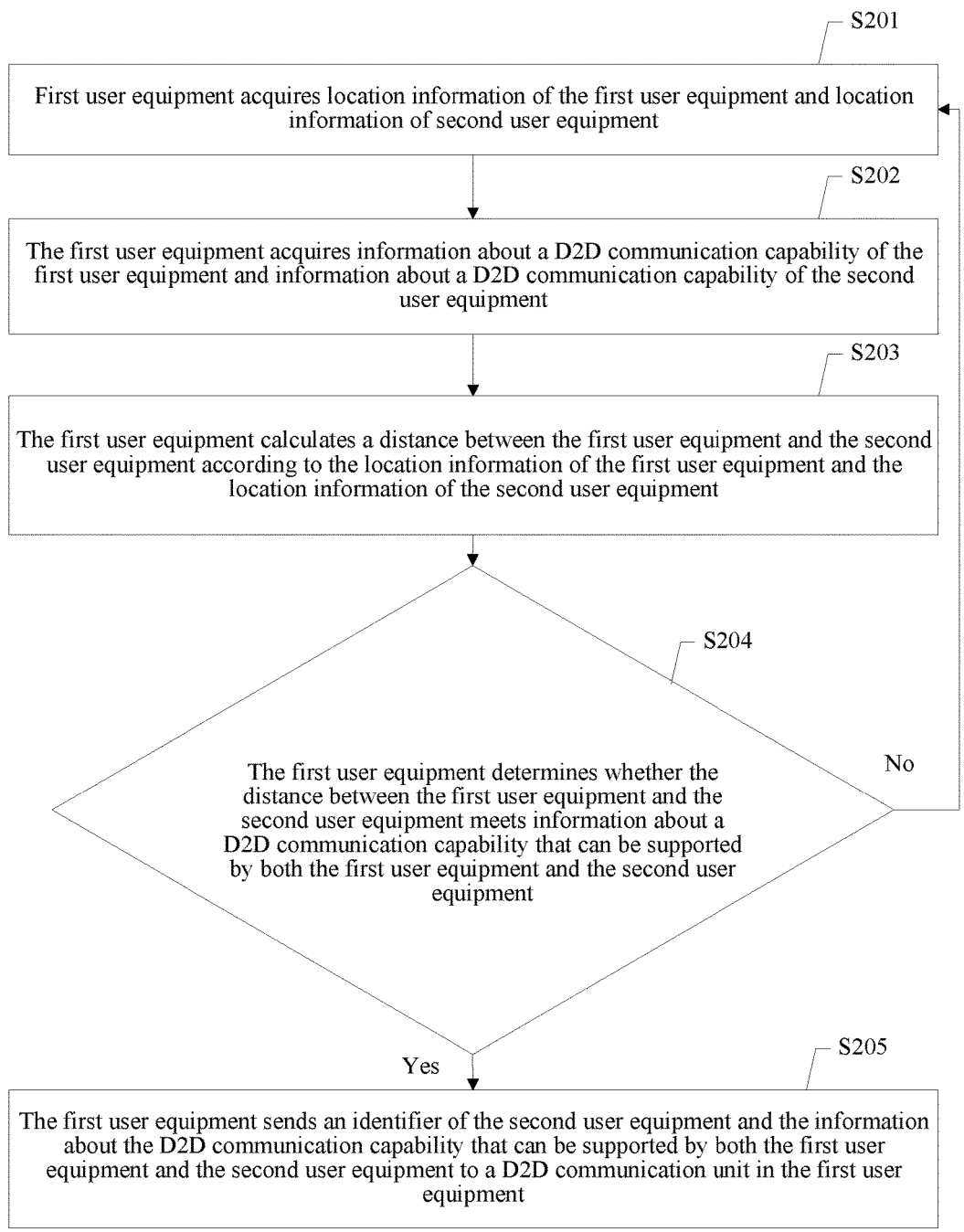
FIG. 2 is a flowchart of a D2D communication discovery method according to a second embodiment of the present invention.
Figure 3:
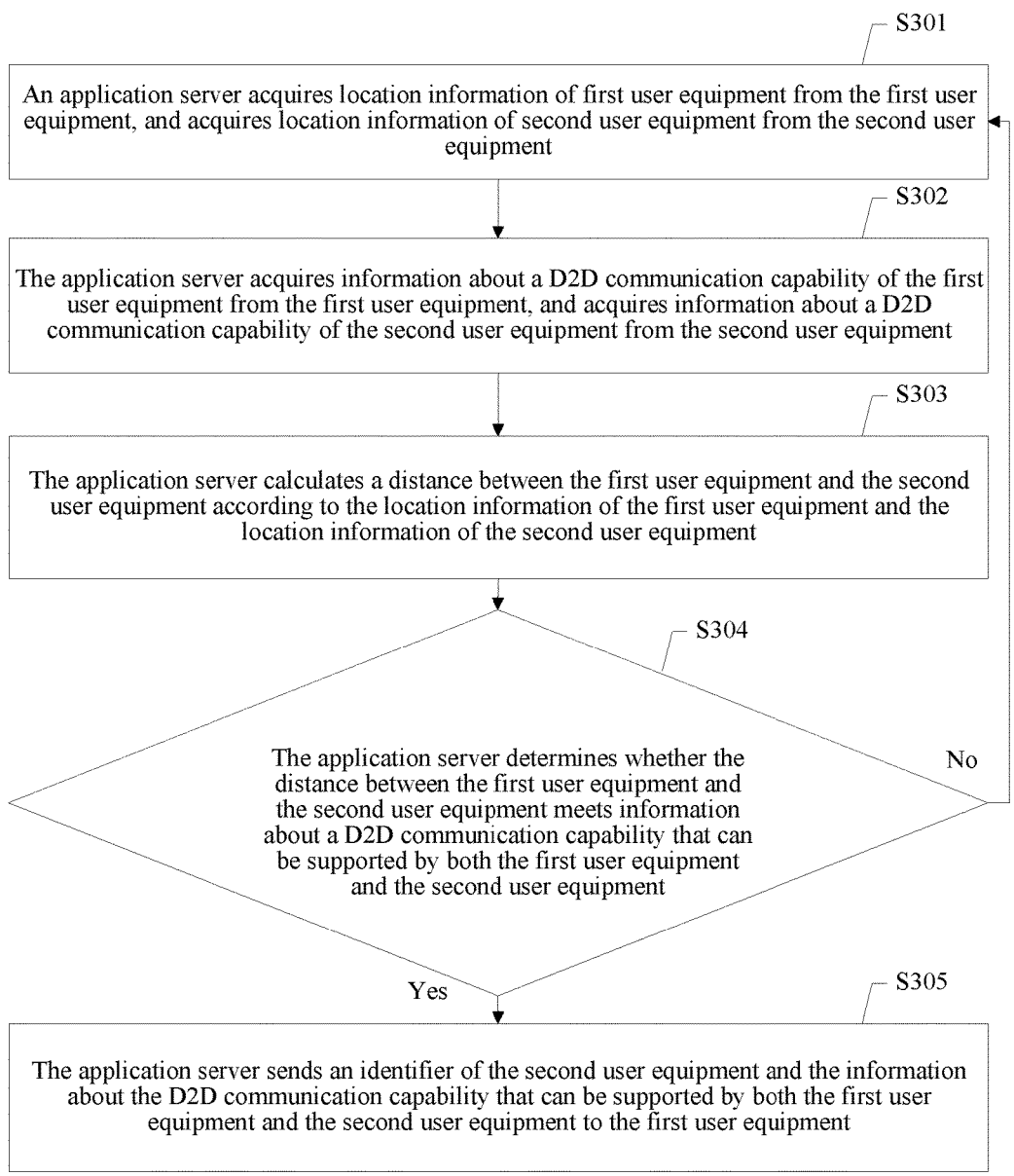
FIG. 3 is a flowchart of a D2D communication discovery method according to a third embodiment of the present invention.

To make the technical problem that needs to be resolved, technical solutions, and benefits of the present invention clearer and more comprehensible, the following further describes the present invention in detail with reference to the accompanying drawings and embodiments.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the embodiments of the present invention, location information of first user equipment and location information of second user equipment may be acquired at an application layer, where the application layer is the seventh layer of a computer network architecture OSI (Open Systems Interconnection). The first layer to the seventh layer of the OSI are respectively a physical layer, a data link layer, a network layer, a transport layer, a session layer, a presentation layer, and an application layer. An application-layer device may include an application server or user equipment, where the application server is a server to which an application in user equipment belongs, for example, an application server corresponding to an instant messaging application. A network element in the embodiments of the present invention, for example, an application server or user equipment, may support D2D communication. For example, for a network element in a cellular network, user equipment UE is required to have a D2D communication capability, for example, have a functional module that supports GPS positioning. For a network element in an ad hoc network such as a non-cellular network, UE is required to have a capability of supporting D2D communication, for example, have a functional module that supports WiFi (Wireless Fidelity, wireless local area network) and Bluetooth, and a port that supports a wired network.

According to the embodiments of the present invention, D2D communication discovery can be implemented by an application server and user equipment, or D2D communication discovery can be implemented by two user equipments.

In the prior art, when D2D communication is implemented between two user equipments, for example, when Bluetooth communication is implemented between two mobile phones, specific steps are as follows: a Bluetooth module of a terminal may be always enabled for scanning, or when a transmission distance supported by Bluetooth is satisfied, a user manually enables a Bluetooth module at a local end, to establish a connection with scanned peer-end Bluetooth; the user may select data to be transmitted by using Bluetooth, and data transmission may be performed by using Bluetooth between the local end and the peer end. In this way, a process of D2D discovery and data transmission is completed, but manual participation is required to enable the Bluetooth module and select to connect to the peer-end Bluetooth. If the Bluetooth module is always enabled for scanning, a hit rate of D2D communication discovery is low, and power of the user equipment is consumed.

In addition, in the prior art, by means of login to an application program, a file, such as a document, audio, or a video, may be sent between a computer and a mobile phone by using a wireless network, and a wired connection does not need to be established between the computer and the mobile phone, but the computer needs to be connected to the network, and the mobile phone needs to be connected to the network. In the prior art, data to be sent is transmitted to a server by using a network, and then is forwarded by the server, instead of being directly received or sent between the two devices. For example, after a user starts an application 1 in the computer, the user selects an option of "Send to my mobile device" to open a window for communication between the two devices, and then adds, in the window, data to be transmitted, that is, a document 1; the computer uploads the document 1 to a server of the application 1; and the server then forwards the document 1 to the mobile phone, so that the mobile phone can receive the document sent by the computer, and the user starts the application 1 in the mobile phone, and can manually click to receive the document 1. According to this solution, a server is not needed for performing forwarding of message content; instead, sending and receiving of the message content is directly implemented between two user equipments, and a process of D2D communication discovery is automatically implemented, without involving manual participation.

According to the embodiments of the present invention, D2D communication discovery can be automatically implemented at an application layer. Specifically, location information of first user equipment and location information of second user equipment may be acquired at the application layer, so that a distance between the first user equipment and the second user equipment is calculated according to the location information of the first user equipment and the location information of the second user equipment, a D2D link establishment instruction is sent to the first user equipment according to the distance between the first user equipment and the second user equipment, and then the first user equipment and the second user equipment establish a D2D communication link, without deploying another device or an additional interface, which reduces network signaling overheads and reduces power consumption. In addition, the location information of the user equipments is acquired at the application layer, for example, the location information may be acquired in one or a combination of multiple manners such as GPS positioning, cell positioning, or cloud positioning. Multiple positioning manners can be supported, which improves positioning precision and can optimize network performance.

A D2D communication discovery method provided in the embodiments of the present invention is described in detail below with reference to FIG. 1 to FIG. 6.

Referring to FIG. 1, FIG. 1 is a flowchart of a D2D communication discovery method according to a first embodiment of the present invention. As shown in FIG. 1, the D2D communication discovery method provided in this embodiment includes S101 to S103.

S101: Acquire, at an application layer, location information of first user equipment and location information of second user equipment.

In an optional implementation manner, the location information may be acquired in one or a combination of multiple manners such as GPS positioning, cell positioning, cloud positioning, and OTDOA positioning. In specific implementation, for a network element in a cellular network, user equipment UE is required to have a D2D communication capability, for example, the user equipment needs to have a functional module that supports GPS positioning and OTDOA positioning. For a network element in an ad hoc network such as a non-cellular network, UE is required to have a capability of supporting D2D communication, for example, have a functional module that supports WiFi and Bluetooth, and a port that supports a wired network.

In specific implementation, the location information may include a network IP address of the user equipment, and longitude and latitude of a location of the user equipment, or may be location information that is determined according to a registered address of an account of an application, an access path of the user equipment, or the like.

This embodiment of the present invention may include at least two user equipments. Specifically, D2D communication can be performed between the two user equipments, where either may be referred to as first user equipment and the other may be referred to as second user equipment.

If an execution body of this embodiment of the present invention is the user equipment, and further, the first user equipment is set as the execution body, acquiring of the location information may be implemented in one of the following three manners, or in another implementation manner, which is not specifically limited by this embodiment of the present invention. The three manners are respectively as follows: Manner 1: The second user equipment actively reports the location information of the second user equipment to the first user equipment. Manner 2: The first user equipment sends a location query request to the second user equipment, and the second user equipment sends the location information of the second user equipment to the first user equipment according to the location query request. Manner 3: The first user equipment requests to an application server for acquiring the location information of the second user equipment, where the application server acquires the location information of the second user equipment in advance. If the execution body of this embodiment of the present invention is an application server, acquiring of the location information may be implemented in one of the following two manners, or in another implementation manner, which is not specifically limited by this embodiment of the present invention. The two manners are respectively as follows: Manner 1: The application server may send a location query request to the first user equipment and the second user equipment, the first user equipment sends the location information of the first user equipment to the application server, and the second user equipment sends the location information of the second user equipment to the application server. Manner 2: The first user equipment actively sends the location information of the first user equipment to the application server, and the second user equipment actively sends the location information of the second user equipment to the application server.

S102: Calculate a distance between the first user equipment and the second user equipment according to the location information of the first user equipment and the location information of the second user equipment.

In an optional implementation manner, the distance between the first user equipment and the second user equipment may be calculated according to the location information of the first user equipment and the location information of the second user equipment. For example, a relative distance between the first user equipment and the second user equipment (for example, 5 meters or 4 meters) may be calculated according to longitude and latitude of the first user equipment and longitude and latitude of the second user equipment. This step may be executed by the application server or the user equipment, and for a specific execution process, reference may be made to FIG. 2 and FIG. 3.

S103: Send a D2D link establishment instruction to the first user equipment according to the distance between the first user equipment and the second user equipment, so that the first user equipment and the second user equipment establish a D2D communication link.

In an optional implementation manner, the D2D link establishment instruction is sent to the first user equipment according to the distance between the first user equipment and the second user equipment, and further, information about a D2D communication capability of the first user equipment may also be acquired, and information about a D2D communication capability of the second user equipment may also be acquired. Specifically, it may be determined whether the distance between the first user equipment and the second user equipment meets information about a D2D communication capability that can be supported by both the first user equipment and the second user equipment.

The information about the D2D communication capability includes but is not limited to a D2D transmission manner and an allowed transmission distance of the D2D transmission manner. The information about the D2D communication capability may further include a priority of the D2D transmission manner, a transmission rate of the D2D transmission manner, or the like, which is not specifically limited by this embodiment of the present invention. Specifically, the information about the D2D communication capability is shown in an example in the table below, where the D2D transmission manner is, for example, Bluetooth, WiFi, or a cellular network, a transmission rate of a D2D transmission manner in the table below is a maximum transmission rate of the D2D transmission manner, and a priority of a D2D transmission manner may be set to three levels, that is, 0 to 2, where a higher level indicates a higher selection priority of the D2D transmission manner.

| D2D transmission manner | Allowed transmission distance | Maximum transmission rate | Priority |
|---|---|---|---|
| Bluetooth | 100 m (Bluetooth 3.0) 10 m (Bluetooth 4.0) | 24 Mbps 1 Mbps | 0 1 |
| WiFi | 600 m | 1 Gbps | 2 |

Specifically, the determining that the distance between the first user equipment and the second user equipment meets information about a D2D communication capability that can be supported by both the first user equipment and the second user equipment may specifically be determining that the distance between the first user equipment and the second user equipment is less than or equal to an allowed transmission distance of the D2D transmission manner that is supported by both the first user equipment and the second user equipment. For example, in step S102, it is obtained by means of calculation that the distance between the first user equipment and the second user equipment is 5 meters, and it is determined, according to the acquired information about the D2D communication capability of the first user equipment and the acquired information about the D2D communication capability of the second user equipment, that the first user equipment supports Bluetooth 3.0 and the second user equipment supports Bluetooth 3.0. Moreover, as an allowed transmission distance of Bluetooth 3.0 is 10 meters, and 5 meters is less than 10 meters, it may be determined that the distance between the first user equipment and the second user equipment meets the information about the D2D communication capability that can be supported by both the first user equipment and the second user equipment, and it may be determined that a D2D transmission manner of the first user equipment and the second user equipment is Bluetooth. Then a D2D link establishment instruction is sent to the first user equipment, where the D2D link instruction includes the determined D2D transmission manner, that is, Bluetooth, so that the first user equipment and the second user equipment establish a D2D communication link according to the D2D link instruction.

Further optionally, a D2D transmission manner with a highest priority may be determined in D2D transmission manners that can be supported by both the first user equipment and the second equipment and that meet the foregoing distance condition; therefore, the information that is sent to the first user equipment and that is about the D2D communication capability that can be supported by both the first user equipment and the second user equipment may specifically include information about the determined D2D transmission manner with the highest priority.

In specific implementation, if there are multiple D2D transmission manners that can be supported by both the first user equipment and the second user equipment and that meet the foregoing distance condition, priorities of the multiple D2D transmission manners may be compared, and a D2D transmission manner with a highest priority is determined as a target transmission manner; therefore, the information that is sent to the first user equipment and that is about the D2D communication capability that can be supported by both the first user equipment and the second user equipment may specifically include information about the determined D2D transmission manner with the highest priority.

Further optionally, a target D2D transmission manner may be determined according to a data volume of service data and transmission rates of D2D transmission manners, where the information that is sent to the first user equipment and that is about the D2D communication capability that can be supported by both the first user equipment and the second user equipment specifically includes information about the determined target D2D transmission manner.

In specific implementation, when a service request is received, the service request may include a data volume of service data. If there are multiple D2D transmission manners that can be supported by both the first user equipment and the second user equipment and that meet the foregoing distance condition, according to the data volume of the service data and transmission rates of the multiple D2D transmission manners, specifically, task execution time may be calculated according to the data volume of the service data and the transmission rates, and a D2D transmission manner whose task execution time is the shortest is determined as the target transmission manner, so that a D2D link access instruction that is sent to the first user equipment may include the determined target transmission manner.

This embodiment of the present invention provides a D2D communication discovery method, which can automatically implement D2D communication discovery at an application layer, where an application-layer device is, for example, an application server or user equipment. Specifically, location information of first user equipment and location information of second user equipment may be acquired at the application layer, so that a distance between the first user equipment and the second user equipment is calculated according to the location information of the first user equipment and the location information of the second user equipment, a D2D link establishment instruction is sent to the first user equipment according to the distance between the first user equipment and the second user equipment, and then the first user equipment and the second user equipment establish a D2D communication link. According to this embodiment of the present invention, D2D communication discovery can be implemented by an application server and user equipment, or D2D communication discovery can be implemented by two user equipments, without deploying another device or an additional interface, which reduces network signaling overheads and reduces power consumption. In addition, the location information of the user equipments is acquired at the application layer, for example, the location information may be acquired in one or a combination of multiple manners such as GPS positioning, cell positioning, or cloud positioning. Multiple positioning manners can be supported, which improves positioning precision and can optimize network performance.

In the foregoing provided implementation manners, acquiring the location information is completed at the application layer, but specifically may be implemented on the application server or the user equipment; the distance between the user equipments may also be implemented on the application server or the user equipment. Based on different execution bodies or a difference in processes, FIG. 4, FIG. 5, and FIG. 6 respectively provide a signaling flowchart. The following uses only FIG. 4 as an example for description, and other content is not described herein again.

Figure 4:
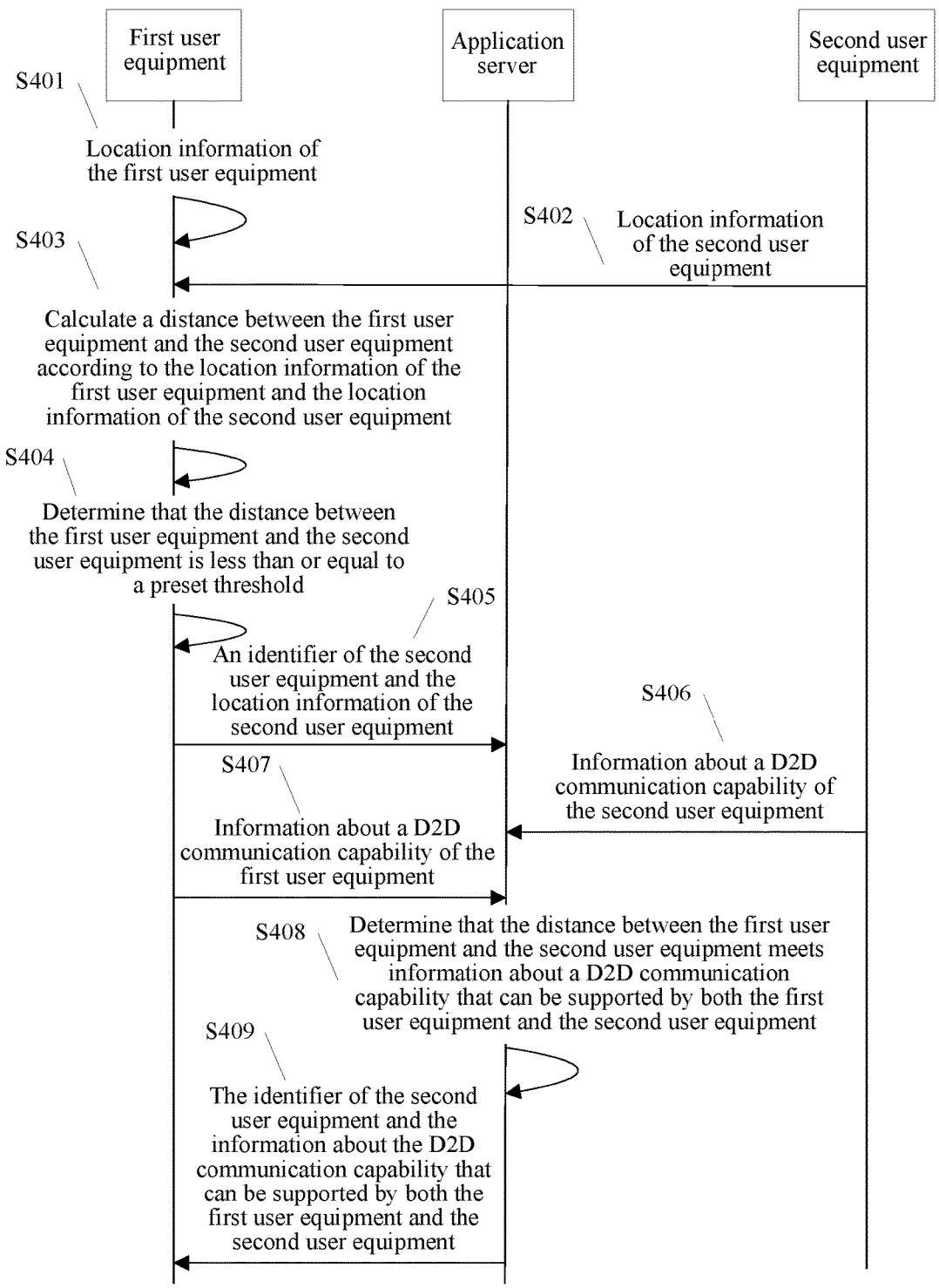
FIG. 4 is a flowchart of a D2D communication discovery method according to a fourth embodiment of the present invention.
Figure 5:
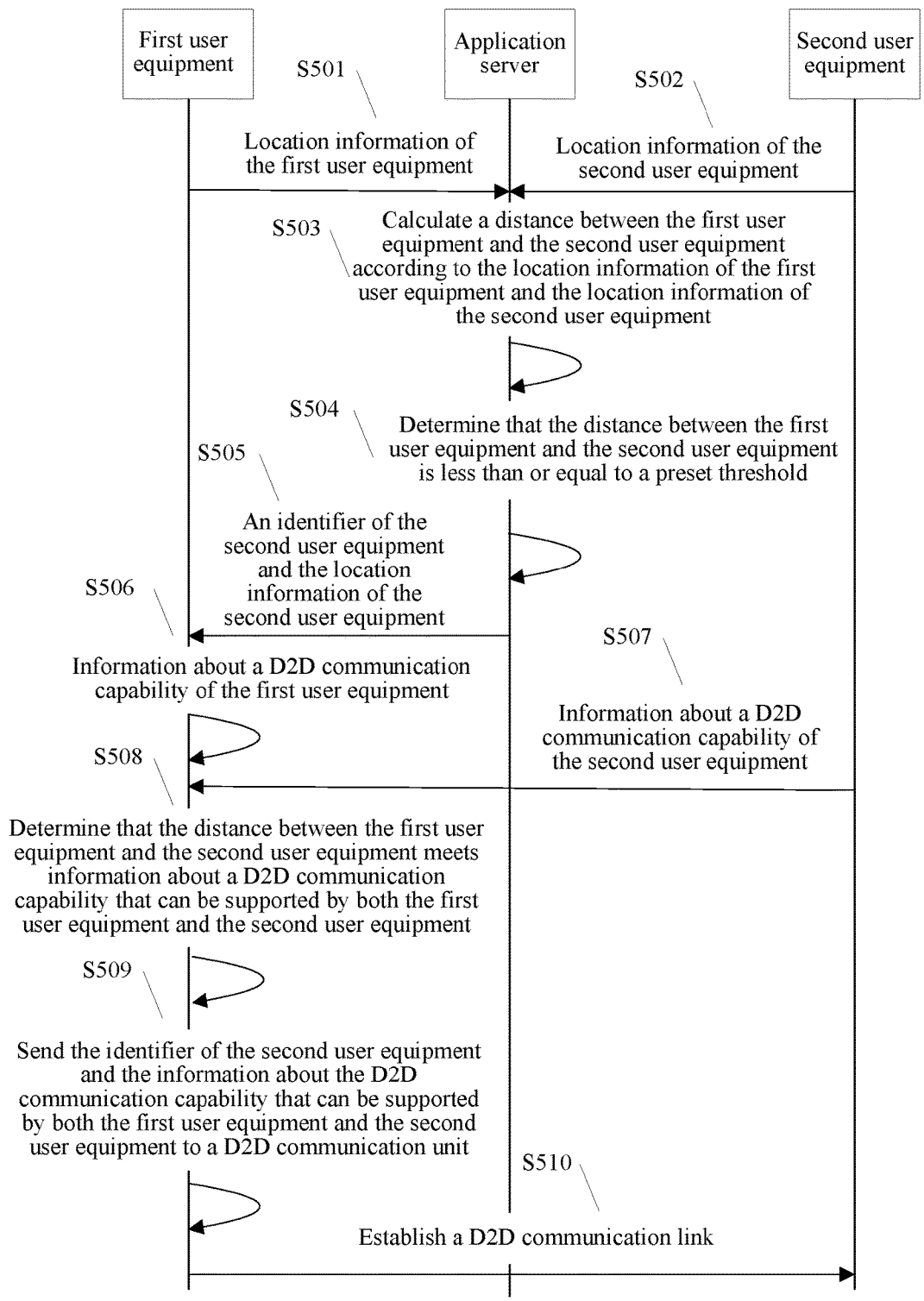
FIG. 5 is a flowchart of a D2D communication discovery method according to a fifth embodiment of the present invention.

Referring to FIG. 4, FIG. 4 is a signaling flowchart of a D2D communication discovery method according to the present invention. A specific implementation form is shown in FIG. 4. The D2D communication discovery method provided in this embodiment includes S401 to S409.

S401: First user equipment acquires location information of the first user equipment.

S402: The first user equipment receives location information of second user equipment that is sent by the second user equipment.

In an optional implementation manner, the first user equipment may send a location query request to the second user equipment, and the second user equipment sends the location information of the second user equipment to the first user equipment according to the location query request. Further, the second user equipment may actively report the location information of the second user equipment to the first user equipment. Further optionally, the location information may be acquired in one or a combination of multiple manners such as GPS positioning, cell positioning, cloud positioning, or OTDOA positioning.

S403: The first user equipment calculates a distance between the first user equipment and the second user equipment according to the location information of the first user equipment and the location information of the second user equipment.

S404: The first user equipment determines that the distance between the first user equipment and the second user equipment is less than or equal to a preset threshold.

In an optional implementation manner, the first user equipment determines that the distance between the first user equipment and the second user equipment is less than or equal to the preset threshold, where the preset threshold may be a preset editable distance value, for example, 10 m, 50 m, or 100 m, and further, the preset threshold may be corresponding to a D2D transmission manner, for example, a preset threshold corresponding to Bluetooth is 10 m, and a preset threshold corresponding to Wi-Fi is 600 m.

S405: The first user equipment sends an identifier of the second user equipment and the location information of the second user equipment to an application server.

In an optional implementation manner, after determining that the distance between the first user equipment and the second user equipment is less than or equal to the preset threshold, the first user equipment sends the identifier of the second user equipment and the location information of the second user equipment to the application server.

S406: The application server acquires information about a D2D communication capability of the second user equipment according to the identifier of the second user equipment and the location information of the second user equipment.

In an optional implementation manner, the second user equipment may send a capability information query request to the second user equipment according to a location of the second user equipment and the identifier of the second user equipment, so that the second user equipment can send the information about the D2D communication capability of the second user equipment to the application server according to the capability information query request. Further optionally, the application server may also acquire the information about the D2D communication capability of the second user equipment from a D2D server, where the D2D server acquires the information about the D2D communication capability of the second user equipment from the second user equipment in advance, and stores the information according to the identifier of the second user equipment.

S407: The application server acquires information about a D2D communication capability of the first user equipment from the first user equipment.

In an optional implementation manner, acquiring of the information about the D2D communication capability may be implemented in one of the following three manners, or in another implementation manner. Manner 1: The application server may send a capability information query request to the first user equipment, and the first user equipment sends the information about the D2D communication capability of the first user equipment to the application server. Manner 2: The first user equipment actively sends the information about the D2D communication capability of the first user equipment to the application server. Manner 3: The application server may also acquire the information about the D2D communication capability of the first user equipment from a D2D server, where the D2D server acquires the information about the D2D communication capability of the first user equipment from the first user equipment in advance, and stores the information according to an identifier of the first user equipment.

S408: The application server determines that the distance between the first user equipment and the second user equipment meets information about a D2D communication capability that can be supported by both the first user equipment and the second user equipment.

In an optional implementation manner, the information about the D2D communication capability includes but is not limited to a D2D transmission manner and an allowed transmission distance of the D2D transmission manner. The information about the D2D communication capability may further include a priority of the D2D transmission manner, a transmission rate of the D2D transmission manner, or the like, which is not specifically limited by this embodiment of the present invention. Specifically, the application server determines that the distance between the first user equipment and the second user equipment is less than or equal to an allowed transmission distance of the D2D transmission manner that is supported by both the first user equipment and the second user equipment.

S409: The application server sends the identifier of the second user equipment and the information about the D2D communication capability that can be supported by both the first user equipment and the second user equipment to the first user equipment.

In an optional implementation manner, after determining that the distance between the first user equipment and the second user equipment meets the information about the D2D communication capability that can be supported by both the first user equipment and the second user equipment, the application server sends the identifier of the second user equipment and the information about the D2D communication capability that can be supported by both the first user equipment and the second user equipment to the first user equipment, so that after receiving the identifier of the second user equipment and the information about the D2D communication capability that can be supported by both the first user equipment and the second user equipment that are sent by the application server, the first user equipment establishes a D2D link with the second user equipment. The first user equipment may actively establish D2D communication with the second user equipment, or may establish D2D communication with the second user equipment when receiving a task request, or may send an identifier of the first user equipment and the information about the D2D communication capability that can be supported by both the first user equipment and the second user equipment to the second user equipment, so that the second user equipment can initiate a D2D communication establishment request to the first user equipment.

According to this embodiment of the present invention, the D2D communication discovery method is implemented at an application layer, and D2D communication discovery is performed by user equipment and an application server, so that D2D communication can be implemented between first user equipment and second user equipment, without deploying another device or an additional interface, which reduces network signaling overheads and reduces power consumption. In addition, location information of the user equipments is acquired at the application layer by the user equipments, for example, the location information may be acquired in one or a combination of multiple manners such as GPS positioning, cell positioning, or cloud positioning. Multiple positioning manners can be supported, which improves positioning precision and can optimize network performance.

Figure 6:
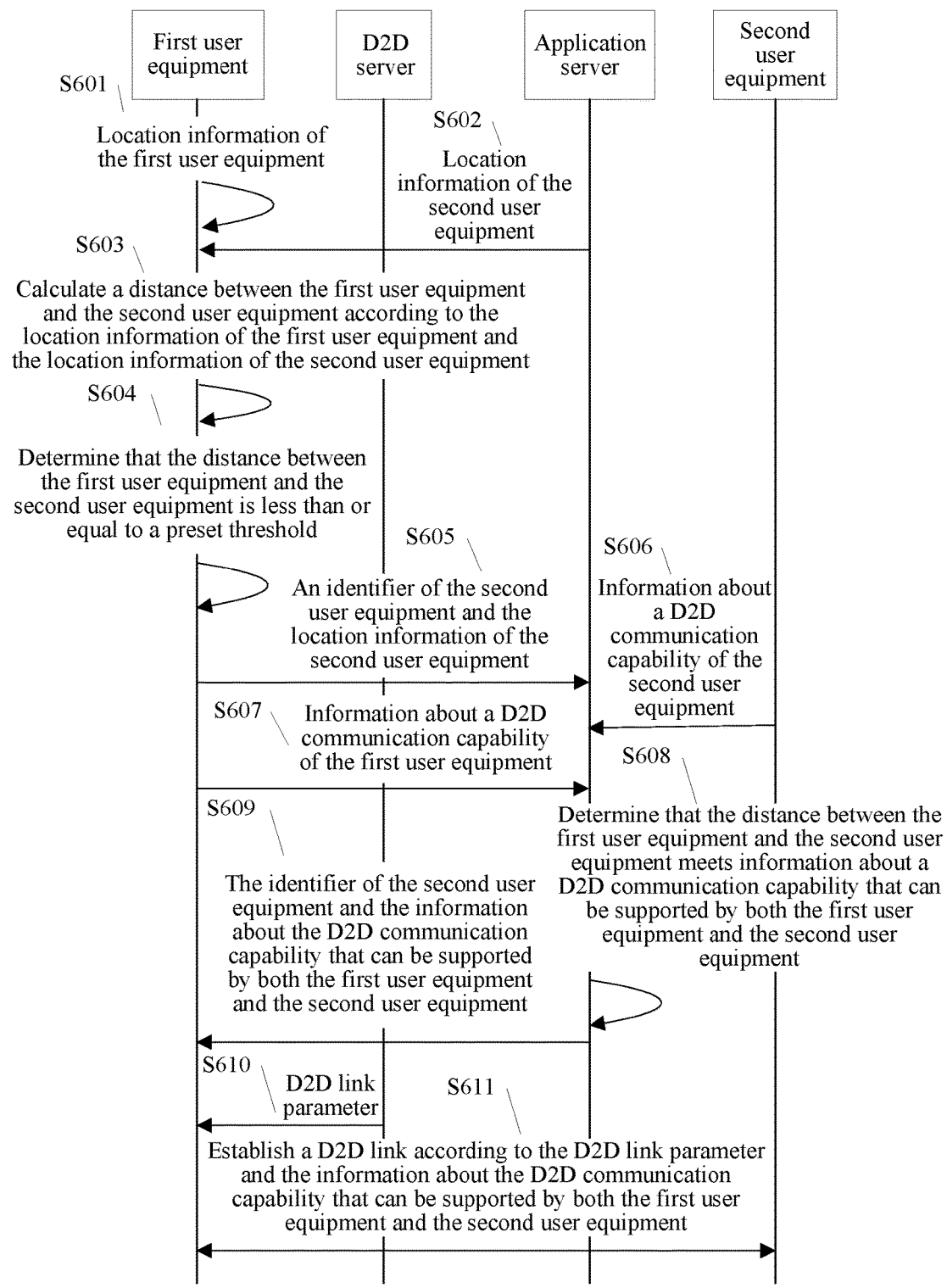
FIG. 6 is a flowchart of a D2D communication discovery method according to a sixth embodiment of the present invention.

Preferably, in the implementation manner shown in FIG. 6, which is an optional implementation manner, the application server may acquire the information about the D2D communication capability of the second user equipment according to a location of the second user equipment and the identifier of the second user equipment. Further, acquiring of the information about the D2D communication capability may be implemented in one of the following four manners, or in another implementation manner, which is not specifically limited by this embodiment of the present invention. The four manners are respectively as follows:

Manner 1: The application server may send a capability information query request to the second user equipment, and the second user equipment sends the information about the D2D communication capability of the second user equipment to the application server.

Manner 2: The second user equipment actively sends the information about the D2D communication capability of the second user equipment to the application server.

Manner 3: If an application server to which an application of the first user equipment belongs and an application server to which an application of the second user equipment belongs are a same application server, the information about the D2D communication capability of the second user equipment is directly found from a local memory according to the identifier of the second user equipment.

Manner 4: If an application server to which an application of the first user equipment belongs is a first application server and an application server to which an application of the second user equipment belongs is a second application server, the first application server acquires the information about the D2D communication capability of the second user equipment from the second application server, where the second application server acquires the information about the D2D communication capability of the second user equipment from the second user equipment in advance.

In the implementation manner shown in FIG. 6, one D2D server may be included, that is, a D2D server to which the first user equipment belongs and a D2D server to which the second user equipment belongs are a same application server, or two D2D servers may be included, that is, the D2D server to which the first user equipment belongs is a first D2D server, and the D2D server to which the second user equipment belongs is a second D2D server. For example, both the first user equipment and the second user equipment access a D2D server in a cellular network of a same telecommunications operator, and for a D2D transmission manner such as Bluetooth or Wi-Fi, the D2D server may be deployed in any host or any network element that can be accessed by user equipment performing D2D communication, for example, may be deployed in a wireless router. Specifically, the user equipment is, for example, user equipment such as a desktop computer, a laptop computer, a tablet, or a smartphone that accesses the wireless router by means of WiFi or a network cable and the user equipment needs to have a functional module that supports a D2D communication capability, such as a wireless network interface card installed in a desktop computer or a Bluetooth adapter.

Further, if two D2D servers are included, addresses of the D2D servers may be obtained according to broadcast information, a communication parameter provided by an operator, subscription data of a network interface card, or a communications protocol. The first D2D server may obtain an address of the second D2D server, so that the first D2D server can perform interactive communication with the second D2D server to determine a D2D link parameter. The first user equipment establishes a D2D link with the second user equipment according to the D2D link parameter, the identifier of the second user equipment, and the information about the D2D communication capability that can be supported by both the first user equipment and the second user equipment.

In an optional implementation manner, the first user equipment may establish a connection with the second user equipment according to the D2D link parameter, and establish a D2D link with the second user equipment by using the information about the D2D communication capability that can be supported by both the first user equipment and the second user equipment.

This embodiment of the present invention provides a D2D communication discovery method. First user equipment may separately acquire location information of the first user equipment and location information of second user equipment, so that a distance between the first user equipment and the second user equipment can be calculated according to the location information of the first user equipment and the location information of the second user equipment; after determining that the distance between the first user equipment and the second user equipment is less than or equal to a preset threshold, the first user equipment sends an identifier of the second user equipment and the location information of the second user equipment to an application server; and further, the application server may separately obtain information about a D2D communication capability of the first user equipment and information about a D2D communication capability of the second user equipment, determine that the distance between the first user equipment and the second user equipment meets information about a D2D communication capability that can be supported by both the first user equipment and the second user equipment, and send an identifier of the second user equipment and the information about the D2D communication capability that can be supported by both the first user equipment and the second user equipment to the first user equipment. Further, a D2D link parameter may further be obtained from a D2D server, and then the first user equipment may establish D2D communication with the second user equipment according to the D2D link parameter and the information about the D2D communication capability that can be supported by both the first user equipment and the second user equipment, which optimizes a network and reduces link interference. According to this embodiment of the present invention, the D2D communication discovery method is implemented at an application layer, and D2D communication discovery is performed by user equipment and an application server, so that D2D communication can be implemented between first user equipment and second user equipment, which reduces network signaling overheads and reduces power consumption. In addition, location information of the user equipments is acquired at the application layer by the user equipments, for example, the location information may be acquired in one or a combination of multiple manners such as GPS positioning, cell positioning, or cloud positioning. Multiple positioning manners can be supported, which improves positioning precision and can optimize network performance.

A D2D communication discovery apparatus provided in an embodiment of the present invention is described in detail below with reference to FIG. 7 and FIG. 9.

Figure 7:
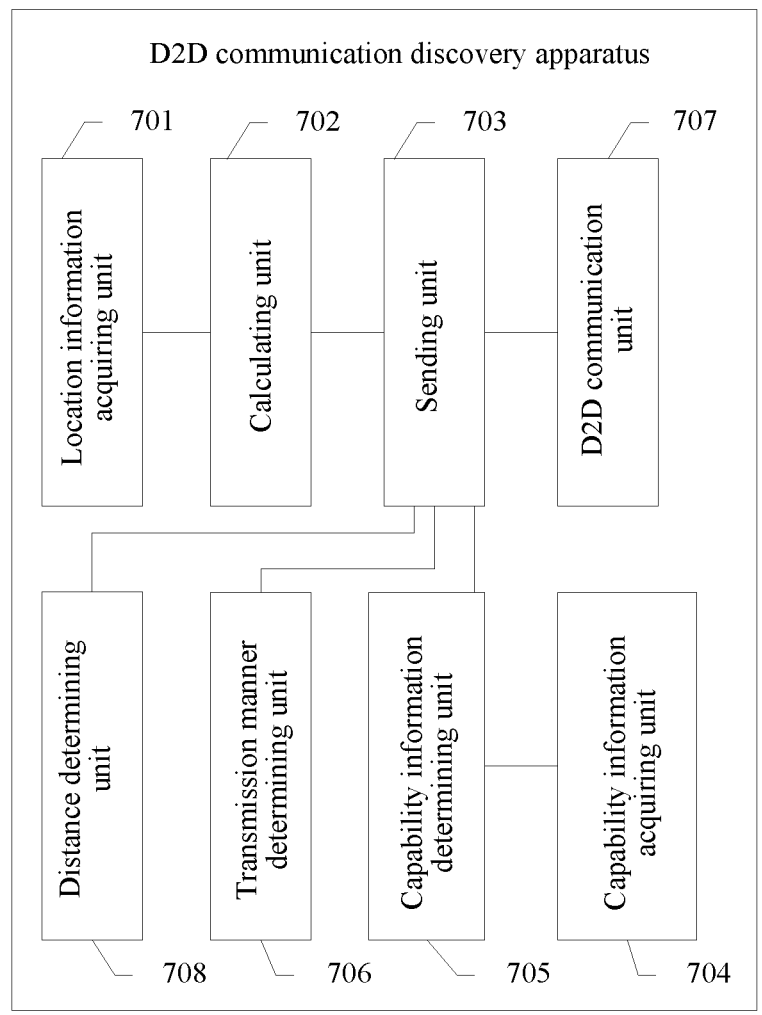
FIG. 7 is a structural diagram of a D2D communication discovery apparatus according to a first embodiment of the present invention.

Referring to FIG. 7, FIG. 7 is a schematic structural diagram of a D2D communication discovery apparatus according to a first embodiment of the present invention. It should be noted that, the D2D communication discovery apparatus shown in FIG. 7 is configured to execute the method in the embodiment of the present invention shown in FIG. 1 or FIG. 2. For ease of description, only a part related to this embodiment of the present invention is shown. For specific technical details not disclosed herein, reference may be made to the embodiment of the present invention shown in FIG. 1 or FIG. 2.

Further optionally, the D2D communication discovery apparatus provided in this embodiment of the present invention may be user equipment, where the user equipment may be mobile user equipment, a PC, a device serving for global communication, or user equipment of another type, and a specific implementation form of user equipment is not limited.

This embodiment of the present invention may include at least two user equipments. Specifically, D2D communication can be performed between the two user equipments, where either may be referred to as first user equipment and the other may be referred to as second user equipment. Further optionally, the D2D communication discovery apparatus in this embodiment of the present invention may be the first user equipment or may be the second user equipment, which is not specifically limited by this embodiment of the present invention.

Specifically, a description is given below by assuming that the apparatus shown in FIG. 7 is the first user equipment.

As shown in FIG. 7, the apparatus may include a location information acquiring unit 701, a calculating unit 702, and a sending unit 703.

The location information acquiring unit 701 is configured to acquire location information of the first user equipment and location information of the second user equipment.

In an optional implementation manner, the location information may be acquired in one or a combination of multiple manners such as GPS positioning, cell positioning, cloud positioning, and OTDOA positioning. In specific implementation, for a network element in a cellular network, user equipment UE is required to have a D2D communication capability, for example, the user equipment needs to have a functional module that supports GPS positioning and OTDOA positioning. For a network element in an ad hoc network such as a non-cellular network, UE is required to have a capability of supporting D2D communication, for example, have a functional module that supports WiFi and Bluetooth, and a port that supports a wired network.

In specific implementation, the location information may include a network IP address of the user equipment, and longitude and latitude of a location of the user equipment, or may be location information that is determined according to a registered address of an account of an application, an access path of the user equipment, or the like.

Further, acquiring of the location information may be implemented in one of the following three manners, or in another implementation manner, which is not specifically limited by this embodiment of the present invention. The three manners are respectively as follows: Manner 1: The second user equipment actively reports the location information of the second user equipment to the first user equipment. Manner 2: The first user equipment sends a location query request to the second user equipment, and the second user equipment sends the location information of the second user equipment to the first user equipment according to the location query request. Manner 3: The first user equipment requests to an application server for acquiring the location information of the second user equipment, where the application server acquires the location information of the second user equipment in advance.

The calculating unit 702 is configured to calculate a distance between the first user equipment and the second user equipment according to the location information of the first user equipment and the location information of the second user equipment that are acquired by the location information acquiring unit 701.

In an optional implementation manner, the distance between the first user equipment and the second user equipment may be calculated according to the location information of the first user equipment and the location information of the second user equipment. For example, a relative distance between the first user equipment and the second user equipment (for example, 5 meters or 4 meters) may be calculated according to longitude and latitude of the first user equipment and longitude and latitude of the second user equipment.

The sending unit 703 is configured to send a D2D link establishment instruction to the first user equipment according to the distance between the first user equipment and the second user equipment that is calculated by the calculating unit 702, so that the first user equipment and the second user equipment establish a D2D communication link.

Further optionally, the D2D communication discovery apparatus provided in this embodiment of the present invention may further include a capability information acquiring unit 704 and a capability information determining unit 705.

The capability information acquiring unit 704 is further configured to acquire information about a D2D communication capability of the first user equipment and information about a D2D communication capability of the second user equipment.

The capability information determining unit 705 is configured to determine that the distance between the first user equipment and the second user equipment meets information about a D2D communication capability that can be supported by both the first user equipment and the second user equipment.

In an optional implementation manner, the capability information acquiring unit 704 may directly acquire the information about the D2D communication capability of the second user equipment from the second user equipment. Further optionally, the capability information acquiring unit 704 may also acquire the information about the D2D communication capability of the second user equipment from an application server, where the application server acquires the information about the D2D communication capability of the second user equipment from the second user equipment in advance, and stores the information according to an identifier of the second user equipment. Further optionally, the capability information acquiring unit 704 may also acquire the information about the D2D communication capability of the second user equipment from a D2D server, where the D2D server acquires the information about the D2D communication capability of the second user equipment from the second user equipment in advance, and stores the information according to an identifier of the second user equipment.

The information about the D2D communication capability includes but is not limited to a D2D transmission manner or an allowed transmission distance of the D2D transmission manner. The information about the D2D communication capability may further include a priority of the D2D transmission manner, a transmission rate of the D2D transmission manner, or the like, which is not specifically limited by this embodiment of the present invention. Specifically, the information about the D2D communication capability is shown in an example in the table below, where the D2D transmission manner is, for example, Bluetooth, WiFi, or a cellular network, a transmission rate of a D2D transmission manner in the table below is a maximum transmission rate of the D2D transmission manner, and a priority of a D2D transmission manner may be set to three levels, that is, 0 to 2, where a higher level indicates a higher selection priority of the D2D transmission manner.

| D2D transmission manner | Allowed transmission distance | Maximum transmission rate | Priority |
| --- | --- | --- | --- |
| Bluetooth | 100 m (Bluetooth 3.0) | 24 Mbps | 0 |
|  | 10 m (Bluetooth 4.0) | 1 Mbps | 1 |
| WiFi | 600 m | 1 Gbps | 2 |

Further optionally, the capability information determining unit 705 is specifically configured to determine that the distance between the first user equipment and the second user equipment is less than or equal to an allowed transmission distance of the D2D transmission manner that is supported by both the first user equipment and the second user equipment.

In specific implementation, for example, it is obtained by means of calculation by the calculating unit 702 that the distance between the first user equipment and the second user equipment is 5 meters, and it is determined, according to the acquired information about the D2D communication capability of the first user equipment and the acquired information about the D2D communication capability of the second user equipment, that the first user equipment supports Bluetooth 3.0 and the second user equipment supports Bluetooth 3.0. Moreover, as an allowed transmission distance of Bluetooth 3.0 is 10 meters, and 5 meters is less than 10 meters, it may be determined that the distance between the first user equipment and the second user equipment meets the information about the D2D communication capability that can be supported by both the first user equipment and the second user equipment, and it may be determined that a D2D transmission manner of the first user equipment and the second user equipment is Bluetooth. Then a D2D link establishment instruction is sent to the first user equipment, where the D2D link instruction includes the determined D2D transmission manner, that is, Bluetooth, so that the first user equipment and the second user equipment establish a D2D communication link according to the D2D link instruction.

Further optionally, the D2D communication discovery apparatus provided in this embodiment of the present invention may further include a transmission manner determining unit 706.

The transmission manner determining unit 706 is configured to determine a D2D transmission manner with a highest priority in D2D transmission manners that can be supported by both the first user equipment and the second user equipment and that meet the distance condition.

The information that is sent by the sending unit 703 to the first user equipment and that is about the D2D communication capability that can be supported by both the first user equipment and the second user equipment specifically includes information about the determined D2D transmission manner with the highest priority.

In specific implementation, if there are multiple D2D transmission manners that can be supported by both the first user equipment and the second user equipment and that meet the foregoing distance condition, priorities of the multiple D2D transmission manners may be compared, and a D2D transmission manner with a highest priority is determined as a target transmission manner; therefore, the information that is sent to the first user equipment and that is about the D2D communication capability that can be supported by both the first user equipment and the second user equipment may specifically include information about the determined D2D transmission manner with the highest priority.

Further optionally, the transmission manner determining unit 706 is further configured to determine a target D2D transmission manner according to a data volume of service data and transmission rates of D2D transmission manners.

The information that is sent by the sending unit 703 to the first user equipment and that is about the D2D communication capability that can be supported by both the first user equipment and the second user equipment specifically includes information about the determined target D2D transmission manner.

In specific implementation, when a service request is received, the service request may include a data volume of service data. If there are multiple D2D transmission manners that can be supported by both the first user equipment and the second user equipment and that meet the foregoing distance condition, according to the data volume of the service data and transmission rates of the multiple D2D transmission manners, specifically, task execution time may be calculated according to the data volume of the service data and the transmission rates, and a D2D transmission manner whose task execution time is the shortest is determined as the target transmission manner, so that a D2D link access instruction that is sent to the first user equipment may include the determined target transmission manner.

Further optionally, the D2D communication discovery apparatus provided in this embodiment of the present invention may further include a D2D communications unit 707.

The D2D communications unit 707 is configured to establish a D2D communication link.

Specifically, the sending unit 703 is specifically configured to send an identifier of the second user equipment and the information about the D2D communication capability that can be supported by both the first user equipment and the second user equipment to the D2D communications unit 707.

In an optional implementation manner, when the capability information determining unit 705 determines that the distance between the first user equipment and the second user equipment meets the information about the D2D communication capability that can be supported by both the first user equipment and the second user equipment, the sending unit 703 sends the identifier of the second user equipment and the information about the D2D communication capability that can be supported by both the first user equipment and the second user equipment to the D2D communications unit 707 in the first user equipment. The D2D communications unit 707 is configured to establish a D2D communication link. The D2D communications unit 707 may actively establish D2D communication with the second user equipment, or may establish D2D communication with the second user equipment when receiving a task request, or may send an identifier of the first user equipment and the information about the D2D communication capability that can be supported by both the first user equipment and the second user equipment to the second user equipment, so that the second user equipment can initiate a D2D communication establishment request to the first user equipment.

Further optionally, the D2D communication discovery apparatus provided in this embodiment of the present invention may further include a distance determining unit 708.

The distance determining unit 708 is configured to determine that the distance between the first user equipment and the second user equipment is less than or equal to a preset threshold.

The sending unit 703 is further configured to send an identifier of the second user equipment and the location information of the second user equipment to an application server.

In an optional implementation manner, the distance determining unit 708 determines that the distance between the first user equipment and the second user equipment is less than or equal to the preset threshold, where the preset threshold may be a preset editable distance value, for example, 10 m, 50 m, or 100 m. Further, the preset threshold may be corresponding to a D2D transmission manner, for example, a preset threshold corresponding to Bluetooth is 10 m, and a preset threshold corresponding to WiFi is 600 m.

Further, after the distance determining unit 708 determines that the distance between the first user equipment and the second user equipment is less than or equal to the preset threshold, the sending unit 703 sends the identifier of the second user equipment and the location information of the second user equipment to the application server, so that the application server acquires information about a D2D communication capability of the first user equipment and information about a D2D communication capability of the second user equipment, determines that the distance between the first user equipment and the second user equipment meets information about a D2D communication capability that can be supported by both the first user equipment and the second user equipment, and sends the identifier of the second user equipment and the information about the D2D communication capability that can be supported by both the first user equipment and the second user equipment to the first user equipment.

In the foregoing technical solution, a D2D communication discovery apparatus is provided, in which a location information acquiring unit may acquire location information of first user equipment and location information of second user equipment, and a capability information acquiring unit may acquire information about a D2D communication capability of the first user equipment and information about a D2D communication capability of the second user equipment, so that a calculating unit can calculate a distance between the first user equipment and the second user equipment according to the location information of the first user equipment and the location information of the second user equipment, and when determining that the distance between the first user equipment and the second user equipment meets information about a D2D communication capability that can supported by both the first user equipment and the second user equipment, a sending unit sends an identifier of the second user equipment and the information about the D2D communication capability that can be supported by both the first user equipment and the second user equipment to a D2D communications unit in the first user equipment, and then the first user equipment can establish D2D communication with the second user equipment. According to this embodiment of the present invention, a D2D communication discovery method is implemented at an application layer, and is implemented only between two user equipments, without deploying another device or an additional interface, which reduces network signaling overheads and reduces power consumption. In addition, location information of the user equipments is acquired at the application layer, for example, the location information may be acquired in one or a combination of multiple manners such as GPS positioning, cell positioning, or cloud positioning. Multiple positioning manners can be supported, which improves positioning precision and can optimize network performance.

It should be noted that the sending unit in this embodiment of the present invention may be a transmitter of the user equipment; in addition, a receiving unit and the sending unit may also be integrated together to form a transceiver of the user equipment. The location information acquiring unit and the calculating unit may be processors that are separately disposed, or may be implemented by being integrated in a specific processor of the user equipment, or may be stored in a memory of the user equipment in a form of program code, and invoked by a processor of the user equipment to perform a function of a foregoing tracking task creating unit. The capability information acquiring unit, the capability information determining unit, the D2D communications unit, the distance determining unit, or the transmission manner determining unit is implemented in a same way as the calculating unit, and may be integrated together with the location information acquiring unit and the calculating unit, or may be implemented separately. The processor described herein may be a central processing unit, or an application-specific integrated circuit, or one or more integrated circuits that are configured to implement this embodiment of the present invention.

Figure 8:
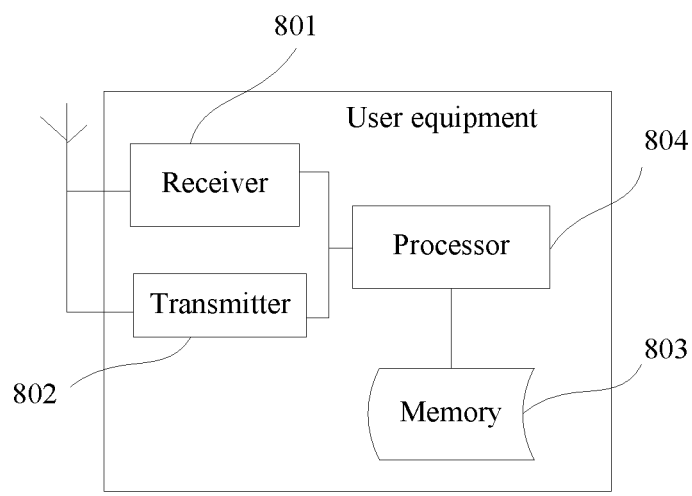
FIG. 8 is a structural diagram of an application server according to an embodiment of the present invention.

Referring to FIG. 8, FIG. 8 is a schematic structural diagram of user equipment according to an embodiment of the present invention. The user equipment provided in this embodiment of the present invention is corresponding to the method shown in FIG. 2, and is an execution body based on the D2D communication discovery method shown in FIG. 2. Further optionally, the user equipment provided in this embodiment of the present invention may be mobile user equipment, a PC, a device serving for global communication, or user equipment of another type, and a specific implementation form of the user equipment is not limited. A specific implementation form is shown in FIG. 8. The user equipment in this embodiment of the present invention may include a receiver 801, a transmitter 802, a memory 803, and a processor 804, where the receiver 801, the transmitter 802, and the memory 803 are all connected with the processor 804, for example, may be connected by using a bus. Certainly, the user equipment may further include a universal component such as an antenna or an input and output apparatus, which is not limited in this embodiment of the present invention.

The receiver 801 and the transmitter 802 may be integrated together to form a transceiver.

The memory 803 is configured to store executable program code, where the program code includes a computer operation instruction. The memory 803 may include a high-speed RAM memory, and may further include a non-volatile memory, for example, at least one magnetic disk storage.

The processor 804 may be a central processing unit, or an application-specific integrated circuit, or one or more integrated circuits that are configured to implement this embodiment of the present invention.

The memory 803 stores a set of program code, and the processor 804 is configured to invoke the program code stored in the memory 803 to perform the following operations:

acquiring, at an application layer, location information of first user equipment and location information of second user equipment;

calculating a distance between the first user equipment and the second user equipment according to the location information of the first user equipment and the location information of the second user equipment; and sending, by using the transmitter 802, a D2D link establishment instruction to the first user equipment according to the distance between the first user equipment and the second user equipment, so that the first user equipment and the second user equipment establish a D2D communication link.

In an optional implementation manner, the processor 804 is further configured to: acquire information about a D2D communication capability of the first user equipment, and acquire information about a D2D communication capability of the second user equipment; and the sending, by the processor 804 by using the transmitter 802, a D2D link establishment instruction to the first user equipment according to the distance between the first user equipment and the second user equipment specifically includes: when it is determined that the distance between the first user equipment and the second user equipment meets information about a D2D communication capability that can be supported by both the first user equipment and the second user equipment, sending an identifier of the second user equipment and the information about the D2D communication capability that can be supported by both the first user equipment and the second user equipment to a D2D communications unit in the processor 804.

In an optional implementation manner, the processor 804 is further configured to: determine that the distance between the first user equipment and the second user equipment is less than or equal to a preset threshold, and send an identifier of the second user equipment and the location information of the second user equipment to an application server.

In an optional implementation manner, the information about the D2D communication capability includes a D2D transmission manner, and an allowed transmission distance of the D2D transmission manner; and The determining, by the processor 804, that the distance between the first user equipment and the second user equipment meets information about a D2D communication capability that can be supported by both the first user equipment and the second user equipment specifically includes:

determining that the distance between the first user equipment and the second user equipment is less than or equal to an allowed transmission distance of the D2D transmission manner that is supported by both the first user equipment and the second user equipment.

In an optional implementation manner, the information about the D2D communication capability further includes a priority of the D2D transmission manner; and the processor 804 is further configured to determine a D2D transmission manner with a highest priority in D2D transmission manners that can be supported by both the first user equipment and the second user equipment and that meet the distance condition, where the information that is sent by the processor 804 to the first user equipment by using the transmitter 802 and that is about the D2D communication capability that can be supported by both the first user equipment and the second user equipment specifically includes information about the determined D2D transmission manner with the highest priority.

In an optional implementation manner, the information about the D2D communication capability further includes a transmission rate of the D2D transmission manner; and the processor 804 is further configured to determine a target D2D transmission manner according to a data volume of service data and transmission rates of D2D transmission manners, where the information that is sent by the processor 804 to the first user equipment by using the transmitter 802 and that is about the D2D communication capability that can be supported by both the first user equipment and the second user equipment specifically includes information about the determined target D2D transmission manner.

In the foregoing technical solution, user equipment is provided, which includes a receiver, a transmitter, a memory, and a processor. The processor may acquire location information of first user equipment, location information of second user equipment, information about a D2D communication capability of the first user equipment, and information about a D2D communication capability of the second user equipment, so that a distance between the first user equipment and the second user equipment can be calculated according to the location information of the first user equipment and the location information of the second user equipment, and when it is determined that the distance between the first user equipment and the second user equipment meets information about a D2D communication capability that can be supported by both the first user equipment and the second user equipment, an identifier of the second user equipment and the information about the D2D communication capability that can be supported by both the first user equipment and the second user equipment are sent to a D2D communications unit in the processor, and then the first user equipment can establish D2D communication with the second user equipment. According to this embodiment of the present invention, a D2D communication discovery method is implemented at an application layer, and is implemented only between two user equipments, without deploying another device or an additional interface, which reduces network signaling overheads and reduces power consumption. In addition, location information of the user equipments is acquired at the application layer, for example, the location information may be acquired in one or a combination of multiple manners such as GPS positioning, cell positioning, or cloud positioning. Multiple positioning manners can be supported, which improves positioning precision and can optimize network performance.

Figure 9:
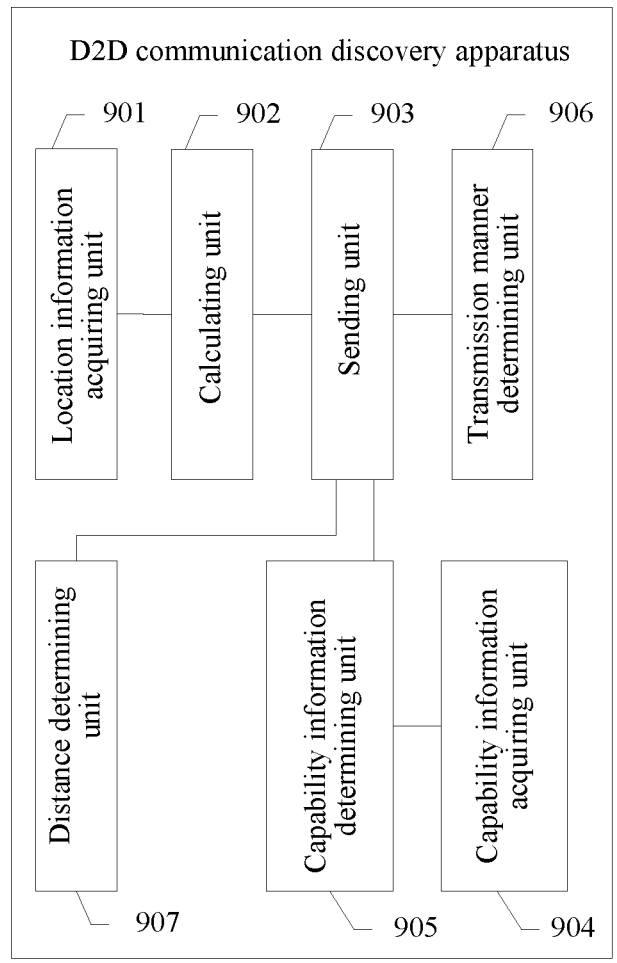
FIG. 9 is a structural diagram of a D2D communication discovery apparatus according to a second embodiment of the present invention.

Referring to FIG. 9, FIG. 9 is a schematic structural diagram of a D2D communication discovery apparatus according to a second embodiment of the present invention. It should be noted that, the D2D communication discovery apparatus shown in FIG. 9 is configured to execute the method in the embodiment of the present invention shown in FIG. 1 or FIG. 3. For ease of description, only a part related to this embodiment of the present invention is shown, and for specific technical details not disclosed herein, reference may be made to the embodiment of the present invention shown in FIG. 1 or FIG. 3. Further optionally, a D2D communication discovery apparatus provided in this embodiment of the present invention may be an application server.

As shown in FIG. 9, the apparatus may include a location information acquiring unit 901, a calculating unit 902, and a sending unit 903.

The location information acquiring unit 901 is configured to acquire location information of first user equipment and location information of second user equipment.

In an optional implementation manner, the location information may be acquired in one or a combination of multiple manners such as GPS positioning, cell positioning, cloud positioning, and OTDOA positioning. In specific implementation, the location information may include a network IP address of the user equipment, and longitude and latitude of a location of the user equipment, or may be location information that is determined according to a registered address of an account of an application, an access path of the user equipment, or the like.

Further, acquiring of the location information may be implemented in either of the following two manners, or in another implementation manner, which is not specifically limited by this embodiment of the present invention. The two manners are respectively as follows: Manner 1: An application server may send a location query request to the first user equipment and the second user equipment, the first user equipment sends the location information of the first user equipment to the application server, and the second user equipment sends the location information of the second user equipment to the application server. Manner 2: The first user equipment actively sends the location information of the first user equipment to the application server, and the second user equipment actively sends the location information of the second user equipment to the application server.

This embodiment of the present invention may include at least two user equipments. Specifically, D2D communication can be performed between the two user equipments, where either may be referred to as the first user equipment and the other may be referred to as the second user equipment.

The calculating unit 902 is configured to calculate a distance between the first user equipment and the second user equipment according to the location information of the first user equipment and the location information of the second user equipment that are acquired by the location information acquiring unit 901.

In an optional implementation manner, the calculating unit 902 may calculate the distance between the first user equipment and the second user equipment according to the location information of the first user equipment and the location information of the second user equipment. For example, a relative distance between the first user equipment and the second user equipment (for example, 5 meters or 4 meters) may be calculated according to longitude and latitude of the first user equipment and longitude and latitude of the second user equipment.

The sending unit 903 is configured to send a D2D link establishment instruction to the first user equipment according to the distance between the first user equipment and the second user equipment that is calculated by the calculating unit 902, so that the first user equipment and the second user equipment establish a D2D communication link.

Further optionally, the D2D communication discovery apparatus provided in this embodiment of the present invention may further include a capability information acquiring unit 904 and a capability information determining unit 905.

The capability information acquiring unit 904 is further configured to acquire information about a D2D communication capability of the first user equipment and information about a D2D communication capability of the second user equipment.

The capability information determining unit 905 is configured to determine that the distance between the first user equipment and the second user equipment meets information about a D2D communication capability that can be supported by both the first user equipment and the second user equipment.

In an optional implementation manner, the capability information acquiring unit 904 may implement acquiring of the information about the D2D communication capability in one of the following three manners, or in another implementation manner, which is not specifically limited by this embodiment of the present invention. The three manners are respectively as follows: Manner 1: An application server may send a capability information query request to the first user equipment and the second user equipment, the first user equipment sends the information about the D2D communication capability of the first user equipment to the application server, and the second user equipment sends the information about the D2D communication capability of the second user equipment to the application server. Manner 2: The first user equipment actively sends the information about the D2D communication capability of the first user equipment to the application server, and the second user equipment actively sends the information about the D2D communication capability of the second user equipment to the application server. Manner 3: The application server may also acquire the information about the D2D communication capability of the first user equipment and the information about the D2D communication capability of the second user equipment from a D2D server, where the D2D server acquires the information about the D2D communication capability of the second user equipment from the second user equipment in advance, acquires the information about the D2D communication capability of the first user equipment from the first user equipment in advance, and stores the information about the D2D communication capability of the second user equipment and the information about the D2D communication capability of the first user equipment according to an identifier of the second user equipment and an identifier of the first user equipment respectively.

The information about the D2D communication capability includes but is not limited to a D2D transmission manner and an allowed transmission distance of the D2D transmission manner. The information about the D2D communication capability may further include a priority of the D2D transmission manner, a transmission rate of the D2D transmission manner, or the like, which is not specifically limited by this embodiment of the present invention. Specifically, the information about the D2D communication capability is shown in an example in the table below, where the D2D transmission manner is, for example, Bluetooth, WiFi, or a cellular network, a transmission rate of a D2D transmission manner in the table below is a maximum transmission rate of the D2D transmission manner, and a priority of a D2D transmission manner may be set to three levels, that is, 0 to 2, where a higher level indicates a higher selection priority of the D2D transmission manner.

| D2D transmission manner | Allowed transmission distance | Maximum transmission rate | Priority |
| --- | --- | --- | --- |
| Bluetooth | 100 m (Bluetooth 3.0) | 24 Mbps | 0 |
|  | 10 m (Bluetooth 4.0) | 1 Mbps | 1 |
| WiFi | 600 m | 1 Gbps | 2 |

Further optionally, the capability information determining unit 904 is specifically configured to determine that the distance between the first user equipment and the second user equipment is less than or equal to an allowed transmission distance of the D2D transmission manner that is supported by both the first user equipment and the second user equipment.

In specific implementation, for example, it is obtained by means of calculation by the calculating unit 902 that the distance between the first user equipment and the second user equipment is 5 meters, and it is determined, according to the information about the D2D communication capability of the first user equipment and the information about the D2D communication capability of the second user equipment that are acquired by the capability information acquiring unit 904, that the first user equipment supports Bluetooth 3.0 and the second user equipment supports Bluetooth 3.0. Moreover, as an allowed transmission distance of Bluetooth 3.0 is 10 meters, and 5 meters is less than 10 meters, it may be determined that the distance between the first user equipment and the second user equipment meets information about a D2D communication capability that can be supported by both the first user equipment and the second user equipment, it may be determined that a D2D transmission manner of the first user equipment and the second user equipment is Bluetooth, and a D2D link establishment instruction is sent to the first user equipment, where the D2D link instruction includes the determined D2D transmission manner, that is, Bluetooth, so that the first user equipment and the second user equipment establish a D2D communication link according to the D2D link instruction.

Further optionally, the D2D communication discovery apparatus provided in this embodiment of the present invention may further include a transmission manner determining unit 906.

The transmission manner determining unit 906 is configured to determine a D2D transmission manner with a highest priority in D2D transmission manners that can be supported by both the first user equipment and the second user equipment and that meet the distance condition.

The information that is sent by the sending unit 903 to the first user equipment and that is about the D2D communication capability that can be supported by both the first user equipment and the second user equipment specifically includes information about the determined D2D transmission manner with the highest priority.

In specific implementation, if there are multiple D2D transmission manners that can be supported by both the first user equipment and the second user equipment and that meet the foregoing distance condition, priorities of the multiple D2D transmission manners may be compared, and a D2D transmission manner with a highest priority is determined as a target transmission manner; therefore, the information that is sent to the first user equipment and that is about the D2D communication capability that can be supported by both the first user equipment and the second user equipment may specifically include information about the determined D2D transmission manner with the highest priority.

Further optionally, the transmission manner determining unit 906 is further configured to determine a target D2D transmission manner according to a data volume of service data and transmission rates of D2D transmission manners.

The information that is sent by the sending unit 903 to the first user equipment and that is about the D2D communication capability that can be supported by both the first user equipment and the second user equipment specifically includes information about the determined target D2D transmission manner.

In specific implementation, when a service request is received, the service request may include a data volume of service data. If there are multiple D2D transmission manners that can be supported by both the first user equipment and the second user equipment and that meet the foregoing distance condition, according to the data volume of the service data and transmission rates of the multiple D2D transmission manners, specifically, task execution time may be calculated according to the data volume of the service data and the transmission rates, and a D2D transmission manner whose task execution time is the shortest is determined as the target transmission manner, so that a D2D link access instruction that is sent to the first user equipment may include the determined target transmission manner.

Further optionally, when the first user equipment determines that the distance between the first user equipment and the second user equipment is less than or equal to a preset threshold, the first user equipment may send an identifier of the second user equipment and the location information of the second user equipment to an application server, so that when the capability information determining unit 905 determines that the distance between the first user equipment and the second user equipment meets the information about the D2D communication capability that can be supported by both the first user equipment and the second user equipment, the sending unit 903 is specifically configured to send the identifier of the second user equipment and the information about the D2D communication capability that can be supported by both the first user equipment and the second user equipment to the first user equipment.

Further optionally, the D2D communication discovery apparatus provided in this embodiment of the present invention may further include a distance determining unit 907.

The distance determining unit 907 is configured to determine that the distance between the first user equipment and the second user equipment is less than or equal to a preset threshold.

The sending unit 903 is further configured to send an identifier of the second user equipment and the location information of the second user equipment to the first user equipment.

In specific implementation, after the distance determining unit 906 determines that the distance between the first user equipment and the second user equipment is less than or equal to the preset threshold, the sending unit 903 sends the identifier of the second user equipment and the location information of the second user equipment to the first user equipment, so that the first user equipment can separately acquire information about a D2D communication capability of the first user equipment and information about a D2D communication capability of the second user equipment, determine that the distance between the first user equipment and the second user equipment meets information about a D2D communication capability that can be supported by both the first user equipment and the second user equipment, and send the identifier of the second user equipment and the information about the D2D communication capability that can be supported by both the first user equipment and the second user equipment to a D2D communications unit in the first user equipment, and then the first user equipment can establish D2D communication with the second user equipment.

In the foregoing technical solution, a D2D communication discovery apparatus is provided, in which a location information acquiring unit may separately acquire location information of first user equipment and location information of second user equipment, and a capability information acquiring unit may acquire information about a D2D communication capability of the first user equipment and information about a D2D communication capability of the second user equipment, so that a calculating unit can calculate a distance between the first user equipment and the second user equipment according to the location information of the first user equipment and the location information of the second user equipment, and when determining that the distance between the first user equipment and the second user equipment meets information about a D2D communication capability that can supported by both the first user equipment and the second user equipment, a sending unit sends an identifier of the second user equipment and the information about the D2D communication capability that can be supported by both the first user equipment and the second user equipment to the first user equipment, and then the first user equipment can establish D2D communication with the second user equipment. According to this embodiment of the present invention, a D2D communication discovery method is implemented at an application layer, and D2D communication discovery is performed by an application server, so that D2D communication can be implemented between first user equipment and second user equipment, without deploying another device or an additional interface, which reduces network signaling overheads and reduces power consumption. In addition, location information of the user equipments is acquired at the application layer, for example, the location information may be acquired in one or a combination of multiple manners such as GPS positioning, cell positioning, or cloud positioning. Multiple positioning manners can be supported, which improves positioning precision and can optimize network performance.

It should be noted that, the sending unit in this embodiment may be a transmitter of the application server, and a receiving unit and the sending unit may be integrated together to form a transceiver of the application server. The location information acquiring unit and the calculating unit may be processors that are separately disposed, or may be implemented by being integrated in a specific processor of the application server, or may be stored in a memory of the application server in a form of program code, and invoked by a processor of the application server to perform functions of the foregoing units. The capability information acquiring unit, the capability information determining unit, the distance determining unit, or the transmission manner determining unit is implemented in a same way as the calculating unit, and may be integrated together with the location information acquiring unit and the calculating unit, or may be implemented separately. The processor described herein may be a central processing unit, or an application-specific integrated circuit, or one or more integrated circuits that are configured to implement this embodiment of the present invention.

Figure 10:
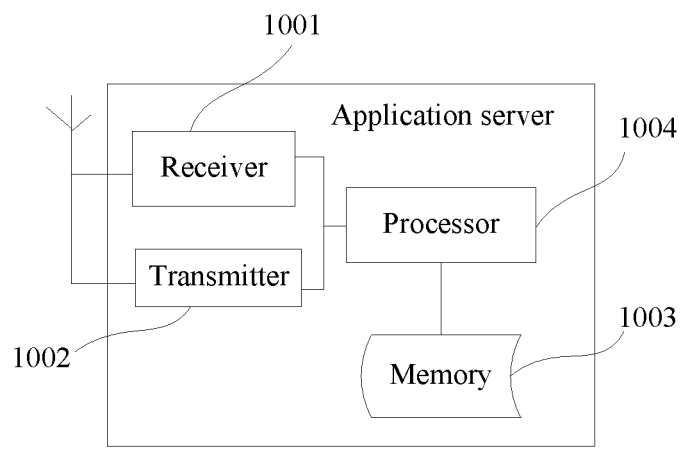
FIG. 10 is a structural diagram of user equipment according to an embodiment of the present invention.

Referring to FIG. 10, FIG. 10 is a schematic structural diagram of an application server according to an embodiment of the present invention. The application server provided in this embodiment is corresponding to the method shown in FIG. 3, and is an execution body based on the D2D communication discovery method shown in FIG. 3. A specific implementation form is shown in FIG. 10. The application server in this embodiment of the present invention may include a receiver 1001, a transmitter 1002, a memory 1003, and a processor 1004, where the receiver 1001, the transmitter 1002, and the memory 1003 are all connected with the processor 1004, for example, may be connected by using a bus. Certainly, the application server may further include a universal component such as an antenna, a baseband processing component, an intermediate radio frequency processing component, or an input and output apparatus, which is not limited by this embodiment of the present invention.

The receiver 1001 and the transmitter 1002 may be integrated together to form a transceiver.

The memory 1003 is configured to store executable program code, where the program code includes a computer operation instruction. The memory 1003 may include a high-speed RAM memory, and may further include a non-volatile memory, for example, at least one magnetic disk storage.

The processor 1004 may be a central processing unit, or an application-specific integrated circuit, or one or more integrated circuits that are configured to implement this embodiment of the present invention.

The memory 1003 stores a set of program code, and the processor 1004 is configured to invoke the program code stored in the memory 1003 to perform the following operations:

acquiring location information of first user equipment and location information of second user equipment;

calculating a distance between the first user equipment and the second user equipment according to the location information of the first user equipment and the location information of the second user equipment; and sending a D2D link establishment instruction to the first user equipment according to the distance between the first user equipment and the second user equipment, so that the first user equipment and the second user equipment establish a D2D communication link.

In an optional implementation manner, the processor 1004 is further configured to: acquire information about a D2D communication capability of the first user equipment and information about a D2D communication capability of the second user equipment; and determine that the distance between the first user equipment and the second user equipment meets information about a D2D communication capability that can be supported by both the first user equipment and the second user equipment.

In an optional implementation manner, the processor 1004 is further specifically configured to send an identifier of the second user equipment and the information about the D2D communication capability that can be supported by both the first user equipment and the second user equipment to the first user equipment.

In an optional implementation manner, the processor 1004 is further configured to determine that the distance between the first user equipment and the second user equipment is less than or equal to a preset threshold; and the processor 1004 is further specifically configured to send an identifier of the second user equipment and the location information of the second user equipment to the first user equipment.

In an optional implementation manner, the information about the D2D communication capability includes a D2D transmission manner, and an allowed transmission distance of the D2D transmission manner; and the processor 1004 is specifically configured to determine that the distance between the first user equipment and the second user equipment is less than or equal to an allowed transmission distance of the D2D transmission manner that is supported by both the first user equipment and the second user equipment.

In an optional implementation manner, the information about the D2D communication capability further includes a priority of the D2D transmission manner; and the processor 1004 is further configured to determine a D2D transmission manner with a highest priority in D2D transmission manners that can be supported by both the first user equipment and the second user equipment and that meet the distance condition, where the information that is sent by the processor 1004 to the first user equipment by using the transmitter 1002 and that is about the D2D communication capability that can be supported by both the first user equipment and the second user equipment specifically includes information about the determined D2D transmission manner with the highest priority.

In an optional implementation manner, the information about the D2D communication capability further includes a transmission rate of the D2D transmission manner; and the processor 1004 is further configured to determine a target D2D transmission manner according to a data volume of service data and transmission rates of D2D transmission manners, where the information that is sent by the processor 1004 to the first user equipment by using the transmitter 1002 and that is about the D2D communication capability that can be supported by both the first user equipment and the second user equipment specifically includes information about the determined target D2D transmission manner.

In the foregoing technical solution, an application server is provided, which includes a receiver, a transmitter, a memory, and a processor. The processor may separately acquire location information of first user equipment, location information of second user equipment, information about a D2D communication capability of the first user equipment, and information about a D2D communication capability of the second user equipment, so that a distance between the first user equipment and the second user equipment can be calculated according to the location information of the first user equipment and the location information of the second user equipment, and when it is determined that the distance between the first user equipment and the second user equipment meets information about a D2D communication capability that can be supported by both the first user equipment and the second user equipment, an identifier of the second user equipment and the information about the D2D communication capability that can be supported by both the first user equipment and the second user equipment are sent to the first user equipment, and then the first user equipment can establish D2D communication with the second user equipment. According to this embodiment of the present invention, a D2D communication discovery method is implemented at an application layer, and D2D communication discovery is performed by an application server, so that D2D communication can be implemented between first user equipment and second user equipment, without deploying another device or an additional interface, which reduces network signaling overheads and reduces power consumption. In addition, location information of the user equipments is acquired at the application layer. Multiple positioning manners can be supported, which improves positioning precision and can optimize network performance.

Further optionally, an embodiment of the present invention further provides a D2D communication discovery system. The D2D communication discovery system provided in this embodiment of the present invention is described in detail below with reference to FIG. 11(*a*) to FIG. 11(*e*). This embodiment of the present invention may include at least two user equipments. Specifically, D2D communication can be performed between the two user equipments, where either may be referred to as first user equipment and the other may be referred to as second user equipment.

As shown in FIG. 11(*a*), FIG. 11(*a*) shows a D2D communication discovery system according to a first embodiment of the present invention, where the system includes first user equipment 11*a* and second user equipment 12*a*. In an optional implementation manner, the first user equipment 11*a* or the second user equipment 12*a* is the apparatus shown in FIG. 7. The first user equipment 11*a* and the second user equipment 12*a* may be connected by using a wireless network or a wired network. For a structure and a function of the apparatus, reference may be made to a related description of the embodiment shown in FIG. 7, and details are not described herein again. It should be noted that, the system in this embodiment may be applied to the foregoing method shown in FIG. 2.

Figure 11A:
FIG. 11a is a schematic diagram of a D2D communication discovery system according to a first embodiment of the present invention.
Figure 11B:
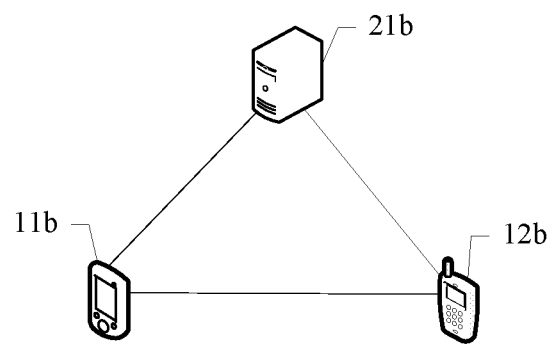
FIG. 11b is a schematic diagram of a D2D communication discovery system according to a second embodiment of the present invention.

As shown in FIG. 11(b), FIG. 11(b) shows a D2D communication discovery system according to a second embodiment of the present invention, where the system includes first user equipment 11b, second user equipment 12b, and an application server 21b. In an optional implementation manner, the first user equipment 11b or the second user equipment 12b, is the apparatus shown in FIG. 7, and the application server 21b is the apparatus shown in FIG. 9. For structures and functions of the apparatuses, reference may be made to related descriptions of the embodiments shown in FIG. 7 and FIG. 9 respectively, and details are not described herein again. The application server 21b may be connected with the first user equipment 11b and the second user equipment 12b respectively by using a wireless network, and the first user equipment 11b and the second user equipment 12b, may be connected by using a wireless network or a wired network. It should be noted that, the system in this embodiment may be applied to any one of the foregoing methods shown in FIG. 3 to FIG. 5. Further optionally, the application server 21b may be one application server, that is, an application server to which an application of the first user equipment 11b belongs and an application server to which an application of the second user equipment 12b belongs are a same application server, or the application server 21b may include two application servers, that is, an application server to which an application of the first user equipment 11b belongs is a first application server, and an application server to which an application of the second user equipment 12b belongs is a second application server.

Figure 11C:
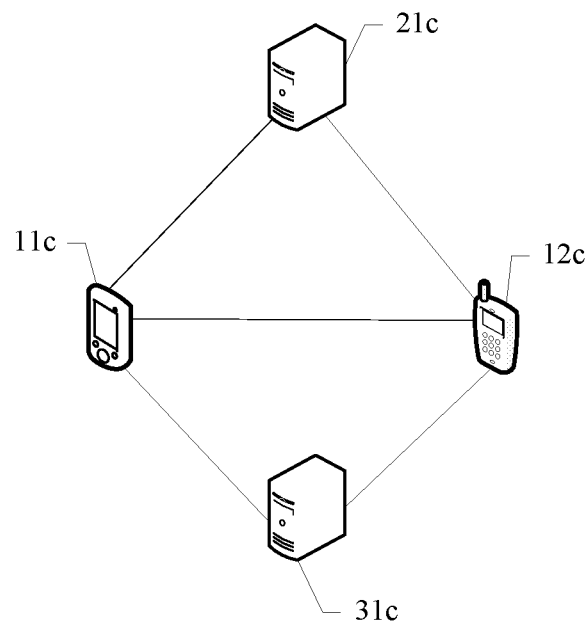
FIG. 11c is a schematic diagram of a D2D communication discovery system according to a third embodiment of the present invention.

As shown in FIG. 11(c), FIG. 11(c) shows a D2D communication discovery system according to a third embodiment of the present invention, where the system includes first user equipment 11c, second user equipment 12C, an application server 21c, and a D2D server sic. In an optional implementation manner, the first user equipment 11c or the second user equipment 12C is the apparatus shown in FIG. 7, and the application server 21C is the apparatus shown in FIG. 9. For structures and functions of the apparatuses, reference may be made to related descriptions of the embodiments shown in FIG. 7 and FIG. 9 respectively, and details are not described herein again. The application server may be connected with the first user equipment 11c and the second user equipment 12C respectively by using a wireless network, the D2D server 31c may be connected with the first user equipment 11c and the second user equipment 12C respectively by using a wireless network, and the first user equipment 11c and the second user equipment 12C may be connected by using a wireless network or a wired network. It should be noted that, the system in this embodiment may be applied to the foregoing method described in FIG. 6.

Figure 11D:
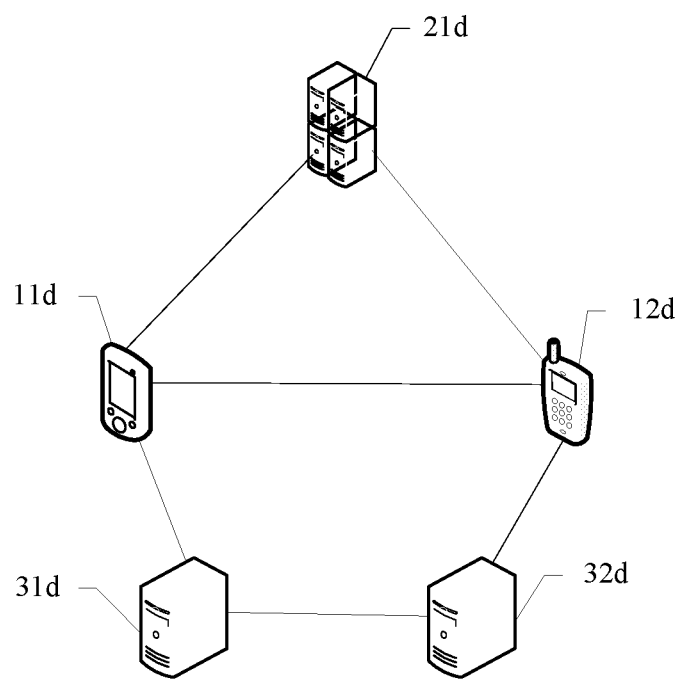
FIG. 11d is a schematic diagram of a D2D communication discovery system according to a fourth embodiment of the present invention.

As shown in FIG. 11(d), FIG. 11(d) shows a D2D communication discovery system according to a fourth embodiment of the present invention, where the system includes first user equipment 11d, second user equipment 12d, an application server 21d, a D2D server 31d, and a D2D application server 32d. In an optional implementation manner, the first user equipment 11d or the second user equipment 12d is the apparatus shown in FIG. 7, and the application server 21d is the apparatus shown in FIG. 9. For structures and functions of the apparatuses, reference may be made to related descriptions of the embodiments shown in FIG. 7 and FIG. 9 respectively, and details are not described herein again. The application server may be connected with the first user equipment 11d and the second user equipment 12d respectively by using a wireless network, the D2D server 31d may be connected with the first user equipment 11d, the D2D server 32d is connected with the second user equipment 12d, the D2D server 31d may be connected with the D2D server 32d, and the first user equipment 11d and the second user equipment 12d may be connected by using a wireless network or a wired network. It should be noted that, the system in this embodiment may be applied to the foregoing method described in FIG. 6.

Figure 11E:
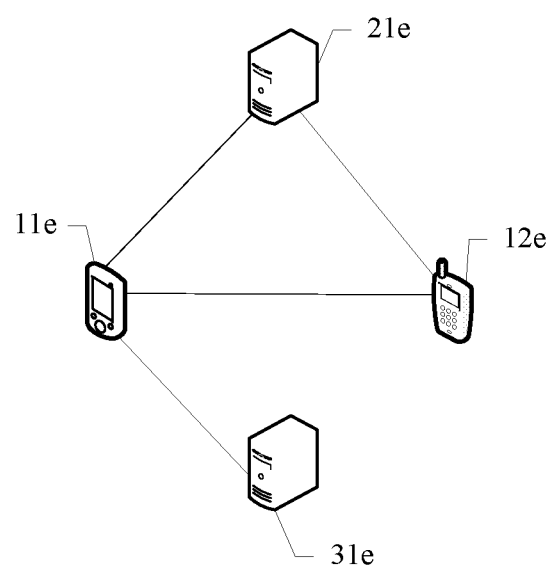
FIG. 11e is a schematic diagram of a D2D communication discovery system according to a fifth embodiment of the present invention.

As shown in FIG. 11(e), FIG. 11(e) shows a D2D communication discovery system according to a fifth embodiment of the present invention, where the system includes first user equipment 11e, second user equipment 12e, an application server 21e, and a D2D server 31e. In an optional implementation manner, the first user equipment 11e or the second user equipment 12e is the apparatus shown in FIG. 7, and the application server 21e is the apparatus shown in FIG. 9. For structures and functions of the apparatuses, reference may be made to related descriptions of the embodiments shown in FIG. 7 and FIG. 9 respectively, and details are not described herein again. The application server may be connected with the first user equipment 11e and the second user equipment 12e respectively by using a wireless network, the D2D server 31e may be connected with the first user equipment 11e by using a wireless network, and the first user equipment 11e and the second user equipment 12e may be connected by using a wireless network or a wired network. It should be noted that, the system in this embodiment may be applied to the foregoing method described in FIG. 6.

To sum up, according to the scheduling request processing method, apparatus, and system provided in the embodiments of the present invention, D2D communication discovery can be automatically implemented at an application layer, and further, D2D communication discovery can be implemented by an application server and user equipment, or D2D communication discovery can be implemented by two user equipments, without deploying another device or an additional interface, which reduces network signaling overheads and reduces power consumption. In addition, location information of the user equipments is acquired at the application layer, for example, the location information may be acquired in one or a combination of multiple manners such as GPS positioning, cell positioning, or cloud positioning. Multiple positioning manners can be supported, which improves positioning precision and can optimize network performance. Further, a D2D link parameter may further be obtained from a D2D server, and then first user equipment may establish D2D communication with second user equipment according to the D2D link parameter and information about a D2D communication capability that can be supported by both the first user equipment and the second user equipment, which optimizes a network and reduces link interference.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and a disc (disc) used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

What is disclosed above is merely exemplary embodiments of the present invention, and certainly is not intended to limit the protection scope of the present invention. Therefore, equivalent variations made in accordance with the claims of the present invention shall fall within the scope of the present invention.

What is claimed is:

1. A device-to-device (D2D) communication method, the method comprising:
    acquiring, by a first user equipment at an application layer, location information of a second user equipment;
    calculating, by the first user equipment, a distance between the first user equipment and the second user equipment according to location information of the first user equipment and the location information of the second user equipment;
    acquiring, by the first user equipment, information about a D2D communication capability of the first user equipment and information about a D2D communication capability of the second user equipment;
    determining, by the first user equipment, that the distance between the first user equipment and the second user equipment meets information about a D2D communication capability that is supported by both the first user equipment and the second user equipment; and
    establishing, by the first user equipment, a D2D communication link between the first user equipment and the second user equipment according to the information about the D2D communication capability that is supported by both the first user equipment and the second user equipment.

2. The method according to claim 1, after calculating the distance between the first user equipment and the second user equipment according to the location information of the first user equipment and the location information of the second user equipment, determining, by the first user equipment, that the distance between the first user equipment and the second user equipment is less than or equal to a preset threshold, and sending, by the first user equipment, an identifier of the second user equipment and the location information of the second user equipment to an application server.

3. The method according to claim 2, further comprising:
    after the application server receives the identifier of the second user equipment and the location information of the second user equipment that are sent by the first user equipment, acquiring, by the application server, information about a D2D communication capability of the first user equipment and information about a D2D communication capability of the second user equipment;
    determining, by the application server, that the distance between the first user equipment and the second user equipment meets information about a D2D communication capability that is supported by both the first user equipment and the second user equipment; and
    sending the identifier of the second user equipment and the information about the D2D communication capability that is supported by both the first user equipment and the second user equipment to the first user equipment.

4. The method according to claim 1,
    wherein the information about the D2D communication capability comprises a D2D transmission manner and an allowed transmission distance of the D2D transmission manner,
    wherein determining that the distance between the first user equipment and the second user equipment meets information about the a D2D communication capability that is supported by both the first user equipment and the second user equipment comprises determining that the distance between the first user equipment and the second user equipment is less than or equal to an allowed transmission distance of the D2D transmission manner that is supported by both the first user equipment and the second user equipment.

5. The method according to claim 4,
    wherein the information about the D2D communication capability further comprises a priority of the D2D transmission manner,
    wherein the method further comprises determining a D2D transmission manner with a highest priority in D2D transmission manners that is supported by both the first user equipment and the second user equipment and that meet a distance condition, and
    wherein the information that is sent to the first user equipment and that is about the D2D communication capability that is supported by both the first user equipment and the second user equipment specifically comprises information about the determined D2D transmission manner with the highest priority.

6. The method according to claim 4,
    wherein the information about a D2D communication capability comprises a transmission rate of a D2D transmission manner,
    wherein the method further comprises determining a target D2D transmission manner according to a data volume of service data and transmission rates of D2D transmission manners, and
    wherein the information that is sent to the first user equipment and that is about the D2D communication capability that is supported by both the first user equipment and the second user equipment specifically comprises information about the determined target D2D transmission manner.

7. A first user equipment comprising:
a memory storing instructions; and
a processor coupled to the memory to execute the instructions to:
- acquire, at an application layer, location information of a second user equipment;
- calculate a distance between the first user equipment and the second user equipment according to location information of the first user equipment and the location information of the second user equipment;
- acquire information about a D2D communication capability of the first user equipment and information about a D2D communication capability of the second user equipment;
- determine that the distance between the first user equipment and the second user equipment meets information about a D2D communication capability that is supported by both the first user equipment and the second user equipment; and
- establish a D2D communication link between the first user equipment and the second user equipment according to the information about the D2D communication capability that is supported by both the first user equipment and the second user equipment.

8. The first user equipment according to claim 7, wherein the first user equipment further executes the instructions to send an identifier of the second user equipment and the information about the D2D communication capability that is supported by both the first user equipment and the second user equipment to a D2D communications unit of the first user equipment.

9. The first user equipment according to claim 7, wherein the first user equipment further executes the instructions to:
- determine that the distance between the first user equipment and the second user equipment is less than or equal to a preset threshold; and
- send an identifier of the second user equipment and the location information of the second user equipment to an application server.

10. The first user equipment according to claim 7, wherein the first user equipment further executes the instructions to send an identifier of the second user equipment and the information about the D2D communication capability that is supported by both the first user equipment and the second user equipment to the first user equipment.

11. The first user equipment according to claim 7, wherein the first user equipment further executes the instructions to:
- determine that the distance between the first user equipment and the second user equipment is less than or equal to a preset threshold; and
- send an identifier of the second user equipment and the location information of the second user equipment to the first user equipment.

12. The first user equipment according to claim 7, wherein the information about the D2D communication capability comprises a D2D transmission manner and an allowed transmission distance of the D2D transmission manner, and wherein the first user equipment further executes the instructions to determine that the distance between the first user equipment and the second user equipment is less than or equal to an allowed transmission distance of the D2D transmission manner that is supported by both the first user equipment and the second user equipment.

13. The first user equipment according to claim 12, wherein the information about the D2D communication capability further comprises a priority of the D2D transmission manner, wherein the first user equipment further executes the instructions to determine a D2D transmission manner with a highest priority in D2D transmission manners that is supported by both the first user equipment and the second user equipment and that meet a distance condition, and wherein the information that is sent to the first user equipment and that is about the D2D communication capability that is supported by both the first user equipment and the second user equipment specifically comprises information about the determined D2D transmission manner with the highest priority.

14. The first user equipment according to claim 12, wherein the information about the D2D communication capability further comprises a transmission rate of the D2D transmission manner, wherein the first user equipment further executes the instructions to determine a target D2D transmission manner according to a data volume of service data and transmission rates of D2D transmission manners, and wherein the information that is sent to the first user equipment and that is about the D2D communication capability that is supported by both the first user equipment and the second user equipment specifically comprises information about the determined target D2D transmission manner.

* * * * *